United States Patent
Yi

(10) Patent No.: US 8,576,810 B2
(45) Date of Patent: Nov. 5, 2013

(54) METHOD AND APPARATUS FOR DETECTING SECONDARY SYNCHRONIZATION SIGNAL

(75) Inventor: Liqiang Yi, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/380,604

(22) PCT Filed: Apr. 29, 2011

(86) PCT No.: PCT/CN2011/073573
§ 371 (c)(1),
(2), (4) Date: Dec. 23, 2011

(87) PCT Pub. No.: WO2012/016456
PCT Pub. Date: Feb. 9, 2012

(65) Prior Publication Data
US 2013/0176991 A1 Jul. 11, 2013

(30) Foreign Application Priority Data
Aug. 5, 2010 (CN) .......................... 2010 1 0251908

(51) Int. Cl.
*H04J 3/00* (2006.01)
(52) U.S. Cl.
USPC .............................. 370/336; 370/338; 370/503
(58) Field of Classification Search
None
See application file for complete search history.

(56) References Cited

U.S. PATENT DOCUMENTS

| | | | |
|---|---|---|---|
| 8,009,701 B2 * | 8/2011 | Luo et al. ...................... | 370/503 |
| 2011/0274097 A1 * | 11/2011 | Zhang et al. .................. | 370/338 |

FOREIGN PATENT DOCUMENTS

| | | |
|---|---|---|
| CN | 101102125 A | 1/2008 |
| CN | 101267226 A | 9/2008 |
| WO | 2009023670 A2 | 2/2009 |

OTHER PUBLICATIONS

International Search Report for PCT/CN2011/073573 dated Jul. 14, 2011.

* cited by examiner

*Primary Examiner* — Andrew Lai
*Assistant Examiner* — Jamaal Henson
(74) *Attorney, Agent, or Firm* — Ling Wu; Stephen Yang; Ling and Yang Intellectual Property

(57) ABSTRACT a method and apparatus for detecting a secondary synchronization signal, the method including: calculating a channel estimation compensation value of each sub-carrier of a Secondary Synchronization Signal (SSS) symbol in different Cyclic Prefix (CP) modes; obtaining-a coherent accumulative results of even half frames and odd half frames of each sub-carrier according to the channel estimation compensation value of each sub-carrier of said SSS symbol; generating a SSS sequence; obtaining an index of the SSS sequence corresponding to an over-threshold value of a first round detection, determining indexes composed of the SSS sequence used in a second round detection according to said index, using coherent accumulative results of all the sub-carriers in the even and odd half frames and SSS sequences of all the sub-carriers to obtain an over-threshold value of the second round detection; and obtaining a CP mode, and calculating a cell ID and a radio frame boundary.

20 Claims, 11 Drawing Sheets

METHOD AND APPARATUS FOR DETECTING SECONDARY SYNCHRONIZATION SIGNAL

TECHNICAL FIELD

The present invention relates to the radio communication field, and in particular, to a method and an apparatus for detecting a secondary synchronization signal.

BACKGROUND OF THE RELATED ART

In order to satisfy the increasing requirements for the data services of people's, the $3^{rd}$ Generation Partnership Project (3GPP) starts the Long Term Evolution (LTE) project of the 3G system, which aims at providing stronger data service support and providing better services for users by the successively evolved 3G systems. The LTE system adopts the Orthogonal Frequency Division Multiplexing (OFDM) transmission technique, which improves the spectrum efficiency and the robustness of the system to the frequency selective channel.

In the radio communication system, when the UE is just powered on, is idle and is in the activated state, the UE is required to perform the cell search to obtain more detailed information about the cell and adjacent cells, so as to initiate other physical layer processes. The performance of the cell search directly affects the performance of the whole system. In the cell search process of the LTE system, UE not only should be synchronized with the serving cell in the time and frequency, but also should detect the physical layer cell identifier of the cell. The available system characteristic for implementing the cell search is the synchronization signal. The synchronization signal in LTE includes the Primary Synchronization Signal (PSS) and the Secondary Synchronization Signal (SSS). Generally, the primary synchronization signal is mainly used for obtaining the 5 ms timing, and sector-ID identification and the like; the secondary synchronization signal is mainly used for implementing the radio frame timing synchronization and cell ID identification and the like.

The time domain structure of the synchronization signal is as shown in FIG. 1. PSS and SSS use the time division multiplexing, and are sent twice in one 10 ms radio frame, namely, once every 5 ms. As for the specific cell, the PSS signals sent twice in one frame are the same, which can act as the 5 ms timing; the SSSs sent twice in one frame are different, which can be used for implementing the 10 ms timing. As for the type of the Frequency Division Duplexing (FDD) frame structure (as shown in FIG. 1A), PSSs are situated at the last symbols of the $0^{th}$ and $10^{th}$ slots, and SSSs are situated at the previous symbols of PSSs. As for the type of the Time Division Duplexing (TDD) mode frame structure (as shown in FIG. 1B), PSSs are situated at the $3^{rd}$ symbols of the sub-frame 1 and sub-frame 6; SSSs are situated at the last symbols of the sub-frame 0 and sub-frame 5, that is, SSS is at the $3^{rd}$ symbol before PSS. In the frequency domain, the synchronization signal is always transmitted at the central position of the downlink transmission bandwidth of the destination cell, and always occupies the intermediate 1.08M bandwidth (PSS and SSS respectively occupy the intermediate 62 sub-carriers of the OFDM symbol, and other 10 sub-carriers are reserved sub-carriers) no matter how the system bandwidth is configured. Although UE does not known the system bandwidth in advance, the fast, low complexity and low overhead cell search can be ensured in different bandwidth configuration.

The secondary synchronization signal detection acts as a very important stage of the cell search, and the prior art proposes two types of detection methods. The Chinese patent application published on 7 Oct. 2009, of which the application number is CN200910078544.9 and the published number is CN101552762A, proposes a method and an apparatus for detecting a cyclic prefix length type and a secondary synchronization signal. It calculates the secondary synchronization signal positions in different cyclic prefix length types according to the primary synchronization channel positions detected through the primary synchronization signals to obtain the secondary synchronization signals, performs the pairwise correlation calculation on the secondary synchronization signals and the replica of secondary synchronization signals in the frequency domain to obtain multiple correlation powers, and detects the maximum value in the multiple correlation powers, thereby determining the practically adopted cyclic prefix length type as well as the cell ID and the radio frame timing. This method uses a method for noncoherent detection, and comparing with the coherent detection, its detection performance has greater degradation, and its correlation calculation uses the total sequence detection, which has the very high computational complexity.

The US patent application US20080273522A1 published on 6 Nov. 2008 proposes a method for generating and detecting a secondary synchronization signal. It performs channel estimation on corresponding received secondary synchronization signals through the received primary synchronization signal, thereby completing the coherent detection of the secondary synchronization signal and further obtaining the cell ID and the radio frame boundary. As for the correlation calculation in the detection, this patent application uses the Fast M-sequence Transform (FMT), which is transformed into the Fast Hadamard Transform (FHT) by the SSS sequence transforming and address mapping. With this method, the computational complexity of the correlation calculation is more greatly reduced, however, the implementation process introduces more address mapping and de-mapping, which additionally increases the resource consumption.

SUMMARY OF THE INVENTION

The technical problem to be solved in the present invention is to provide a method and an apparatus for detecting a secondary synchronization signal, so as to reduce the computational complexity of the correlation.

In order to solve the above technical problem, the present invention provides a method for detecting a secondary synchronization signal, and said method comprises:

calculating a channel estimation compensation value of each sub-carrier of a Secondary Synchronization Signal (SSS) symbol in different Cyclic Prefix (CP) modes;

obtaining a coherent accumulative result of even half frames and a coherent accumulative result of odd half frames of each sub-carrier according to the channel estimation compensation value of each sub-carrier of said SSS symbol;

generating a SSS sequence;

using the coherent accumulative results of even sub-carriers in the even or odd half frames and the even sub-carriers of the SSS sequences to perform correlation calculation and compute an energy, obtaining an index $\hat{m}_i$ of the SSS sequence corresponding to an over-threshold value of a first round detection, determining indexes $m_0$, $m_1$ composed of the SSS sequence used in a second round detection, wherein one of $m_0$ and $m_1$ is $\hat{m}_i$, and $m_1 - m_0 = \Delta_j$, $\Delta_j = 1, 2 \ldots, 7$;

using coherent accumulative results of all the sub-carriers in even and odd half frames and SSS sequences of all the sub-carriers to perform collocation correlation calculation and compute an energy, obtaining an over-threshold value of the second round detection; and obtaining a CP mode according to a parameter corresponding to the over-threshold value of the second round detection, and calculating a cell Identifier (ID) and a radio frame boundary.

In the method, the step of calculating the channel estimation compensation value of each sub-carrier of the SSS symbol in different CP modes comprises:

performing channel estimation on a Primary Synchronization Signal (PSS) symbol to obtain a channel estimation value of each sub-carrier of the PSS symbol;

transforming the channel estimation value to a time domain, performing threshold denoising on a Channel Impulse Response (CIR) area, transforming a denoised CIR to a frequency domain to obtain a denoised frequency domain channel estimation value; and using the denoised frequency domain channel estimation value and a transformed SSS frequency domain symbol to perform channel compensation to obtain a channel estimation compensation value of each sub-carrier of the SSS symbol.

In the method, in the step of calculating the channel estimation compensation value of each sub-carrier of the SSS symbol in different CP modes, a buffer scheduling way of transform of the time domain and the frequency domain comprises:

in processing duration of a certain antenna, performing in turn: transforming the SSS symbol from the time domain to the frequency domain in an extended CP mode, transforming the PSS symbol from the time domain to the frequency domain in the extended CP mode, transforming the channel estimation value from the frequency domain to the time domain in the extended CP mode, transforming the denoised CIR from the time domain to the frequency domain in the extended CP mode, transforming the denoised CIR from the time domain to the frequency domain in a normal CP mode, and transforming SSS from the time domain to the frequency domain in the normal CP mode in sequence; a buffer firstly buffering SSS frequency domain data in the extended CP mode in the processing duration of the certain antenna and being not released until completing channel estimation compensation in the extended CP mode, and then buffering a denoised frequency domain channel estimation value in the normal CP mode and being not released until completing the channel estimation compensation in the normal CP mode.

The step of performing threshold denoising on the CIR area comprises:

$\lambda_1$ samples at a front end and $\lambda_2$ samples at a back end of a channel estimation value sequence in the time domain acting as the CIR area, and other areas being a noise area, selecting a maximum amplitude of the noise area as a noise threshold, all the channel estimation values lower than the noise threshold in the CIR area being noise, and setting all the channel estimation values lower than the noise threshold in the CIR area to be 0.

In the method, the step of obtaining the coherent accumulative result of even half frames and the coherent accumulative result of odd half frames of each sub-carrier comprises:

performing even and odd numbering on the half frames where the SSS symbols or the SSS symbols after the channel estimation compensation are situated, performing maximum ratio combining among SSS symbol channel compensation value antennae of the same half frame, and performing coherent accumulation by dividing even and odd respectively to obtain the coherent accumulative result of even half frames and the coherent accumulative result of odd half frames of each sub-carrier.

In the method, the step of using the coherent accumulative results of the even sub-carriers in the even or odd half frames and the SSS sequences of the even sub-carriers to perform correlation calculation and compute the energy and obtaining the index $\hat{m}_i$ of the SSS sequence corresponding to the over-threshold value of the first round detection or the step of using coherent accumulative results of all the sub-carriers in the even and odd half frames and SSS sequences of all the sub-carriers to perform collocation correlation calculation and compute the energy and obtaining the over-threshold value of the second round detection comprises:

calculating correlation values in the extended CP mode and the normal CP mode according to the coherent accumulative result of the even and/or odd half frames and the SSS sequences;

calculating correlation energy values according to the correlation values;

computing an average of a summation of the correlation energy values to multiply a detection threshold coefficient to obtain a detection threshold, wherein a summation range of the first round detection is the correlation energy values obtained in the first round detection, and a summation range of the second round detection is the correlation energy values obtained in the first round detection and the correlation energy values obtained in the second round detection; and performing threshold judgment on the correlation energy values according to the detection threshold to obtain the over-threshold values of the first round detection or the second round detection.

In the method, the over-threshold value of the first round detection is obtained according to an average of correlation energy value of the first round detection multiplying a detection threshold coefficient, if the first round detection does not have the over-threshold value, then the detection threshold coefficient is adjusted within a range of times $M_0$ of the first round detection, and an adjustment way is:

$$\alpha_1^{i+1}=\alpha_1^{i}-\delta \ i=0,1,\Lambda,M_0-2$$

wherein $\delta$ is an adjusting step.

In the method, the step of performing collocation correlation calculation comprises:

when the first round detection uses the coherent accumulative results of the even sub-carriers in the even half frames to perform the correlation calculation, and if $\hat{m}_i$ is $m_0$, performing collocation correlation on the coherent accumulative results of all the sub-carriers in the even and odd half frames with the SSS sequences of all the sub-carriers in sub-frame 0 and sub-frame 5 respectively to obtain an even odd collocation correlation value; if $\hat{m}_i$ is $m_1$, using the coherent accumulative results of all the sub-carriers in the odd and even half frames to respectively perform the collocation correlation with the SSS sequences of all the sub-carriers in sub-frame 0 and sub-frame 5 to obtain an odd even collocation correlation value;

when the first round detection uses the coherent accumulative results of the even sub-carriers in the odd half frames to perform the correlation calculation, and if $\hat{m}_i$ is $m_1$, performing collocation correlation on the coherent accumulative results of all the sub-carriers in the even and odd half frames with the SSS sequences of all the sub-carriers in sub-frame 0 and sub-frame 5 respectively to obtain an even odd collocation correlation value; if $\hat{m}_i$ is $m_0$, using the coherent accumulative results of all the sub-carriers in the odd and even half frames to respectively perform the collocation correlation with the SSS sequences of all the sub-carriers in sub-frame 0 and sub-frame 5 to obtain an odd even collocation correlation value.

In the method, in the step of obtaining the CP mode according to the parameter corresponding to the over-threshold value of the second round detection, and calculating the cell ID and the radio frame boundary, a cell ID group is obtained according to $\Delta_j$ and $m_0$ corresponding to the over-threshold value of the second round detection and following formula:

$$N_{ID}^{(1)} = \begin{cases} m_0 & \text{when } \Delta_j = 1 \\ m_0 + 30 & \text{when } \Delta_j = 2 \\ m_0 + 59 & \text{when } \Delta_j = 3 \\ m_0 + 87 & \text{when } \Delta_j = 4 \\ m_0 + 114 & \text{when } \Delta_j = 5 \\ m_0 + 140 & \text{when } \Delta_j = 6 \\ m_0 + 165 & \text{when } \Delta_j = 7 \end{cases}$$

and a corresponding cell ID is $$N_{ID}^{cell} = 3N_{ID}^{(1)} + N_{ID}^{(2)}$$

wherein $N_{ID}^{(2)}$ is a sector-ID.

if the correlation energy value of the extended CP mode exceeds the threshold in the second round detection, then the detected cell CP mode is the extended CP; conversely, the detected cell CP mode is the normal CP mode;

if the over-threshold value in the second round detection corresponds to an even odd half frame collocation correlation value, then a radio frame timing phrase is sub-frame 0 followed by sub-frame 5; if the over-threshold value in the second round detection corresponds to an odd even half frame collocation correlation value, then radio frame timing is the sub-frame 5 followed by the sub-frame 0.

In order to solve the above technical problem, the present invention further provides an apparatus for detecting a secondary synchronization signal, which comprises:

a channel estimation compensation unit, which is configured to: calculate a channel estimation compensation value of each sub-carrier of a SSS symbol in different Cyclic Prefix (CP) modes or a specified CP mode;

a half frame coherent accumulation unit, which is connected with the channel estimation compensation unit; the half frame coherent accumulation unit is configured to: obtain a coherent accumulative result of even half frames and a coherent accumulative result of odd half frames of each sub-carrier according to the channel estimation compensation value of each sub-carrier of said SSS symbol;

a sequence generation unit, which is configured to: generate a Secondary Synchronization Signal (SSS) sequence;

a two round detection unit, which is connected with said half frame coherent accumulation unit and said sequence generation unit, and said two round detection unit is configured to: use the coherent accumulative results of even sub-carriers in the even or odd half frames and the SSS sequences of the even sub-carriers to perform correlation calculation and compute an energy, obtain an index $\hat{m}_i$ of the SSS sequence corresponding to an over-threshold value of a first round detection; and determine indexes $m_0$, $m_1$ composed of the SSS sequence used in a second round detection according to said index $\hat{m}_i$, and use coherent accumulative results of all the sub-carriers in the even and odd half frames and SSS sequences of all the sub-carriers to perform collocation correlation calculation and compute an energy, and obtain an over-threshold value of the second round detection, wherein one of $m_0$ and $m_1$ is $\hat{m}_i$, and $m_1 - m_0 = \Delta_j$, $\Delta_j = 1, 2 \ldots, 7$;

secondary synchronization signal calculation unit, which is connected with said two round detection unit; said secondary synchronization signal calculation unit is configured to: obtain a CP mode according to parameters corresponding to an over-threshold value of the second round detection if the channel estimation compensation unit calculates the channel estimation compensation value of each sub-carrier of the SSS symbol in different CP modes, and calculate a cell Identifier (ID) and a radio frame boundary; calculate the cell ID and the radio frame boundary according to parameters corresponding to an over-threshold value of the second round detection if the channel estimation compensation unit calculates the channel estimation compensation value of each sub-carrier of the SSS symbol in the specified CP mode.

In the apparatus, said half frame coherent accumulation unit is configured to obtain the coherent accumulative result of even half frames and the coherent accumulative result of odd half frames of each sub-carrier in a following way: performing even and odd numbering on the half frames where the SSS symbols or the SSS symbols after the channel estimation compensation are situated, performing maximum ratio combining among SSS symbol channel compensation value antennae of the same half frame, and performing coherent accumulation by dividing even and odd respectively to obtain the coherent accumulative result of even half frames and the coherent accumulative result of odd half frames of each sub-carrier.

In the apparatus, said two round detection unit comprises:

a correlation calculation module, which is configured to: calculate correlation values in an extended CP mode and a normal CP mode according to the coherent accumulative result of the even and/or odd half frames and SSS sequences if the channel estimation compensation unit calculates the channel estimation compensation value of each sub-carrier of the SSS symbol in different CP modes; calculate the correlation value in the specified CP mode according to the coherent accumulative result of the even and/or odd half frames and the SSS sequence if the channel estimation compensation unit calculates the channel estimation compensation value of each sub-carrier of the SSS symbol in the specified CP mode;

an energy calculation module, which is connected with the correlation calculation module; said energy calculation module is configured to: calculate correlation energy values according to the correlation value calculated by the correlation calculation module;

a threshold determination module, which is configured to: compute an average of a summation of the correlation energy values to multiply a detection threshold coefficient to obtain a detection threshold, wherein a summation range of the first round detection is the correlation energy values obtained in the first round detection, and a summation range of the second round detection is the correlation energy values obtained in the first round detection and the correlation energy values obtained in the second round detection;

a threshold judgment module, which is configured to: perform the threshold judgment on the correlation energy value obtained in the first around detection according to a first round detection threshold and perform the threshold judgment on the correlation energy value obtained in the second around according to a second round detection threshold; and a collocation number determination module, which is configured to: determine indexes $m_0$, $m_1$ composed of the SSS sequence used by the second round detection by an index $\hat{m}_i$ of the SSS sequence corresponding to the over-threshold value in the first round detection.

In the apparatus, when the over-threshold value does not appear in the first round detection, said threshold determination module is further configured to: adjust the detection threshold coefficient in a range of times $M_0$ of the first round detection, and an adjustment way is:

$$\alpha_1^{i+1}=\alpha_1^{i}-\delta\ i=0,1,\Lambda,M_0-2$$

wherein $\delta$ is an adjusting step.

In the apparatus, said correlation calculation module is configured to calculate correlation values in the extended CP mode and the normal CP mode or correlation values in the specified CP mode according to the coherent accumulative result of the even and/or odd half frames and SSS sequences in a following way:

when the first round detection uses the coherent accumulative results of the even sub-carriers in the even half frames to perform the correlation calculation, in the second round detection, if $\hat{m}_i$ is $m_0$, said correlation calculation module using the coherent accumulative results of all the sub-carriers in the even and odd half frames to respectively perform collocation correlation with the SSS sequences of all the sub-carriers in sub-frame 0 and sub-frame 5 to obtain an even odd collocation correlation value; if $\hat{m}_i$ is $m_1$, said correlation calculation module using the coherent accumulative results of all the sub-carriers in the odd and even half frames to respectively perform the collocation correlation with the SSS sequences of all the sub-carriers in sub-frame 0 and sub-frame 5 to obtain an odd even collocation correlation value;

when the first round detection uses the coherent accumulative results of the even sub-carriers in the odd half frames to perform the correlation calculation, in the second round detection, if $\hat{m}_i$ is $m_1$, said correlation calculation module using the coherent accumulative results of all the sub-carriers in the even and odd half frames to respectively perform collocation correlation with the SSS sequences of all the sub-carriers in sub-frame 0 and sub-frame 5 to obtain an even odd collocation correlation value; if $\hat{m}_i$ is $m_0$, said correlation calculation module using the coherent accumulative results of all the sub-carriers in the odd and even half frames to respectively perform the collocation correlation with the SSS sequences of all the sub-carriers in sub-frame 0 and sub-frame 5 to obtain an odd even collocation correlation value.

In order to solve the above technical problem, the present invention further provides a method for detecting a secondary synchronization signal, and said method comprises:

calculating a channel estimation compensation value of each sub-carrier of a Secondary Synchronization Signal (SSS) symbol in a specified Cyclic Prefix (CP) mode;

obtaining a coherent accumulative result of even half frames and a coherent accumulative result of odd half frames of each sub-carrier according to the channel estimation compensation value of each sub-carrier of said SSS symbol;

generating a SSS sequence;

using the coherent accumulative results of the even sub-carriers in the even or odd half frames and the SSS sequences of the even sub-carriers to perform correlation calculation and compute an energy, obtaining an index $\hat{m}_i$ of the SSS sequence corresponding to an over-threshold value of a first round detection, determining indexes $m_0$, $m_1$ composed of the SSS sequence used in a second round detection, wherein one of $m_0$ and $m_1$ is $\hat{m}_i$, and $m_1-m_0=\Delta_j$, $\Delta_j=1, 2 \ldots, 7$;

using coherent accumulative results of all the sub-carriers in the even and odd half frames and SSS sequences of all the sub-carriers to perform collocation correlation calculation and compute an energy, obtaining an over-threshold value of the second round detection; and calculating a cell Identifier (ID) and a radio frame boundary according to the over-threshold value of the second round detection.

In the method, the step of calculating the channel estimation compensation value of each sub-carrier of the SSS symbol in the specified CP mode comprises:

performing channel estimation on a Primary Synchronization Signal (PSS) symbol to obtain a channel estimation value of each sub-carrier of the PSS symbol;

transforming the channel estimation value to a time domain, performing threshold denoising on a Channel Impulse Response (CIR) area, transforming a denoised CIR to a frequency domain to obtain a denoised frequency domain channel estimation value; and using the denoised frequency domain channel estimation value and a transformed SSS frequency domain symbol to perform channel compensation to obtain a channel estimation compensation value of each sub-carrier of the SSS symbol.

In the method, wherein in the step of calculating the channel estimation compensation value of each sub-carrier of the SSS symbol in the specified CP mode, a buffer scheduling way of transform of the time domain and the frequency domain comprises:

in processing duration of a certain antenna, performing in turn: transforming the SSS symbol from the time domain to the frequency domain in the specified CP mode, transforming the PSS symbol from the time domain to the frequency domain in the specified CP mode, transforming the channel estimation value from the frequency domain to the time domain in the specified CP mode, transforming the denoised CIR from the time domain to the frequency domain in the specified CP mode; a buffer firstly buffering SSS frequency domain data in the specified CP mode in the processing duration of the certain antenna and being not released until completing channel estimation compensation in the specified CP mode.

The step of obtaining the coherent accumulative result of even half frames and the coherent accumulative result of odd half frames of each sub-carrier comprises:

performing even and odd numbering on the half frames where the SSS symbols or the SSS symbols after the channel estimation compensation are situated, performing maximum ratio combining among SSS symbol channel compensation value antennae of the same half frame, and performing coherent accumulation by dividing even and odd respectively to obtain the coherent accumulative result of even half frames and the coherent accumulative result of odd half frames of each sub-carrier.

In the method, the step of using the coherent accumulative results of even sub-carriers in the even or odd half frames and the SSS sequences of the even sub-carriers to perform correlation calculation and compute the energy and obtaining the index $\hat{m}_i$ of the SSS sequence corresponding to the over-threshold value of the first round detection or the step of using coherent accumulative results of all the sub-carriers in the even and odd half frames and SSS sequences of all the sub-carriers to perform collocation correlation calculation and compute the energy and obtaining the over-threshold value of the second round detection comprises:

calculating correlation values in the specified CP mode according to the coherent accumulative result of the even and/or odd half frames and the SSS sequences;

calculating correlation energy values according to the correlation values;

computing an average of a summation of the correlation energy values to multiply a detection threshold coefficient to obtain a detection threshold, wherein a summation range of the first round detection is the correlation energy values obtained in the first round detection, and a summation range of the second round detection is the correlation energy values obtained in the first round detection and the correlation energy values obtained in the second round detection; and performing threshold judgment on the correlation energy values according to the detection threshold to obtain the over-threshold values of the first round detection or the second round detection.

In the method, the step of performing collocation correlation calculation comprises:

when the first round detection uses the coherent accumulative results of the even sub-carriers in the even half frames to perform the correlation calculation, and if $\hat{m}_i$ is $m_0$, performing collocation correlation on the coherent accumulative results of all the sub-carriers in the even and odd half frames with the SSS sequences of all the sub-carriers in sub-frame 0 and sub-frame 5 respectively to obtain an even odd collocation correlation value; if $\hat{m}_i$ is $m_1$, using the coherent accumulative results of all the sub-carriers in the odd and even half frames to respectively perform the collocation correlation with the SSS sequences of all the sub-carriers in sub-frame 0 and sub-frame 5 to obtain an odd even collocation correlation value;

when the first round detection uses the coherent accumulative results of the even sub-carriers in the odd half frames to perform the correlation calculation, and if $\hat{m}_i$ is $m_1$, performing collocation correlation on the coherent accumulative results of all the sub-carriers in the even and odd half frames with the SSS sequences of all the sub-carriers in sub-frame 0 and sub-frame 5 respectively to obtain an even odd collocation correlation value; if $\hat{m}_i$ is $m_0$, using the coherent accumulative results of all the sub-carriers in the odd and even half frames to respectively perform the collocation correlation with the SSS sequences of all the sub-carriers in sub-frame 0 and sub-frame 5 to obtain an odd even collocation correlation value.

The method and the apparatus for detecting the secondary synchronization signal of the present invention use the two round detection method to detect the SSS, which greatly reduces the calculation quantity of the correlation calculation without increasing additional resource consumption, and implements the higher efficient detection on a basis of ensuring the performance. The present invention uses a threshold denoising method to improve the performance of the channel estimation, which has a not large computational complexity. The present invention uses multiple times of FFT/IFFT in the detection process, and applies a high efficient scheduling policy, which occupies the least resources.

PREFERRED EMBODIMENTS OF THE PRESENT INVENTION

In order to make the objects, the technical scheme and the advantages of the present invention clearer, below examples of the present invention will be described with reference to the drawings in detail. It should be noted that the examples and features in examples in this application can be randomly combined to each other in the case without conflicts.

The main concept of the method and the apparatus for detecting a secondary synchronization signal of the present invention is: firstly performing the first round detection according to a coherent accumulative result of even sub-carriers in the even or odd half frames and a correlation result of the SSS sequences of the even sub-carriers, and further using the coherent accumulative results of all the sub-carriers in the even and odd half frames and SSS sequences of sub-frames 0 and sub-frames 5 of all the sub-carriers to perform the second round detection to obtain a detection result of the secondary synchronization signal based on the result of the first round detection, thereby reducing the calculation quantity of the correlation calculation.

Figure 1:
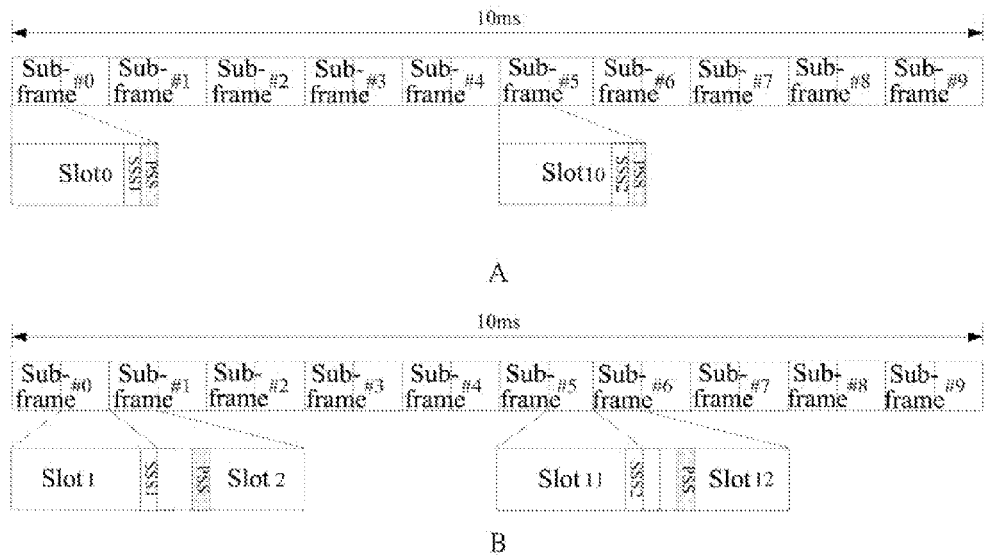
FIG. 1 is a schematic diagram of the type of the frame structure in LTE.
Figure 2:
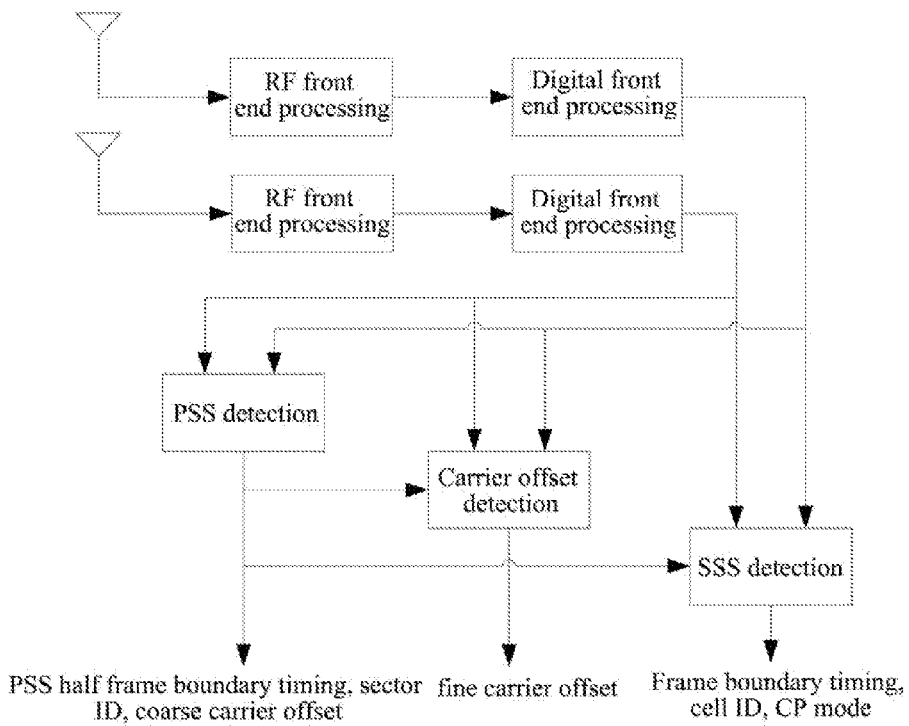
FIG. 2 is a block diagram of receiving the SSS symbol.

The block diagram of receiving SSS symbols is as shown in FIG. 2. The signal received by the antenna is input into the digital front end via the RF front end to be processed. The RF front end processing specifically comprises modules such as RF signal conditioning, filtering, down conversion, and analog to digital conversion and so on; the digital front end processing comprises modules such as radio frequency imperfect receiving Inphase Quadrature (IQ) data compensation, frequency offset compensation, Automatic Gain Control (AGC), down sampling filtering, and weight processing among antennae (energy balance among antennae) and so on, wherein the down sampling filtering reduces the sampling rate 30.72 MHz of the data to the sampling rate 1.92 MHz. The cell search part processes the time domain data processed by the digital front end. The cell search part mainly comprises the PSS detection, the fine carrier frequency offset detection, and the SSS detection. PSS detection completes 5 ms timing, namely the half frame timing, and the determination of the sector-ID and coarse carrier offset; the fine carrier frequency offset detection module further performs the fine frequency offset detection after the coarse carrier frequency offset adjustment; the SSS detection related to the present invention is the detection that uses the PSS detection positions and the sector-ID after the fine frequency offset compensation to obtain the cell ID, the radio frame boundary and the Cyclic Prefix (CP) mode. Three stages of detection can use the flow calculation in practical.

Figure 3:
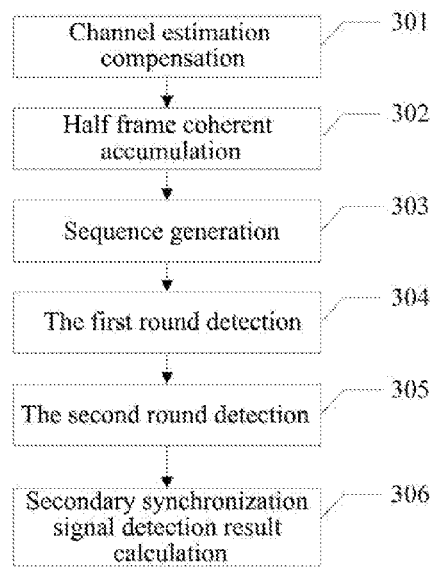
FIG. 3 is a flow chart of the method for detecting a secondary synchronization signal according to an example of the present invention.
Figure 4:
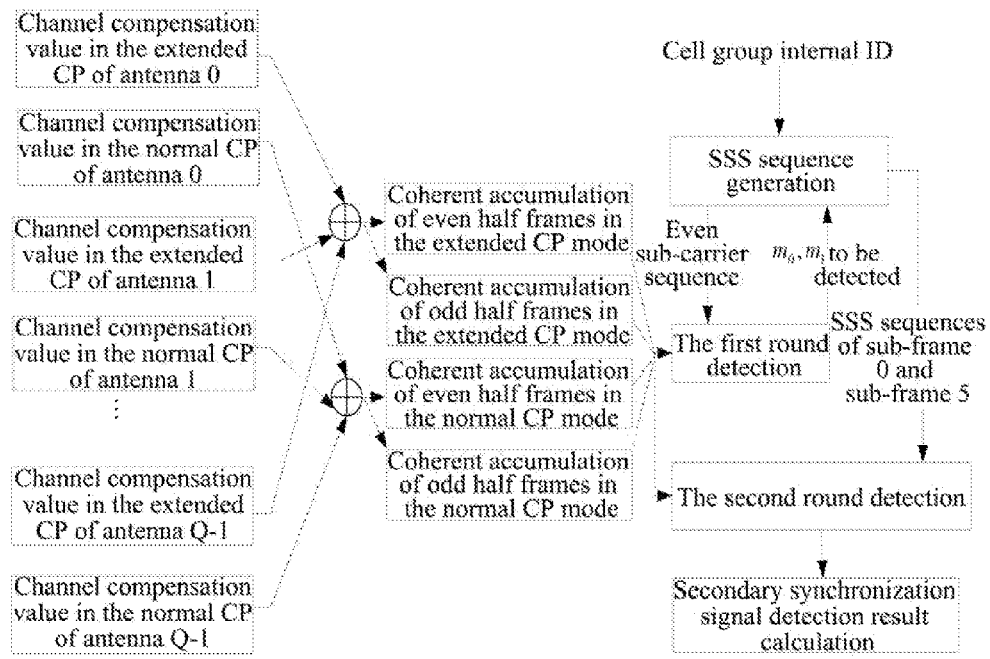
FIG. 4 is a block diagram of the method for detecting a secondary synchronization signal according to an example of the present invention.

As shown in FIG. 3 and FIG. 4, the method for detecting a secondary synchronization signal according to the example of the present invention comprises:

step 301, a step of channel estimation compensation, in which channel estimation compensation values of each sub-carriers of the SSS symbols in different Cyclic Prefix (CP) modes are calculated;

step 302, a step of half frame coherent accumulation, in which the coherent accumulative results of even half frames and the coherent accumulative results of odd half frames of each sub-carriers are obtained according to channel estimation compensation values of each sub-carriers of the SSS symbols;

step 303, a step of sequence generation, in which a sequence of the secondary synchronization signal (SSS) is generated;

step 304, a step of the first round detection, in which a correlation calculation is performed using the coherent accumulative results of the even sub-carriers in the even or odd half frames and the SSS sequence of the even sub-carriers to obtain the index $\hat{m}_t$ of the SSS sequence corresponding to the over-threshold value of the first round detection;

step 305, a step of the second round detection, in which indexes $m_0$, $m_1$ of the composed SSS sequence used in the second round detection are determined according to the index $\hat{m}_t$, and collocation correlation calculation and energy computation are performed using the coherent accumulative results of all the sub-carriers in the even and odd half frames and the SSS sequences of all the sub-carriers to obtain the over-threshold value of the second round detection, wherein one of $m_0$, $m_1$ is $\hat{m}_t$, and $m_1-m_0=\Delta_j$, $\Delta_j=1, 2, \ldots, 7$;

step 306, a step of the secondary synchronization signal detection result calculation, in which the CP mode is obtained according to the parameters corresponding to the over-threshold value of the second round detection, and the cell ID and the radio frame boundary are calculated.

Below various processes of the examples of the present invention are described in detail.

1. Channel Estimation Compensation

Channel estimation compensation comprises:

the channel estimation is performed on the PSS symbol to obtain the channel estimation value of each sub-carrier of the PSS symbol; and the channel estimation value of each sub-carrier of the PSS symbol is approximated as the channel estimation value of each sub-carrier of the SSS symbol, which is used to perform channel estimation compensation with the transformed SSS frequency domain symbol to obtain the channel compensation value of each sub-carrier of the SSS symbol.

Figure 5:
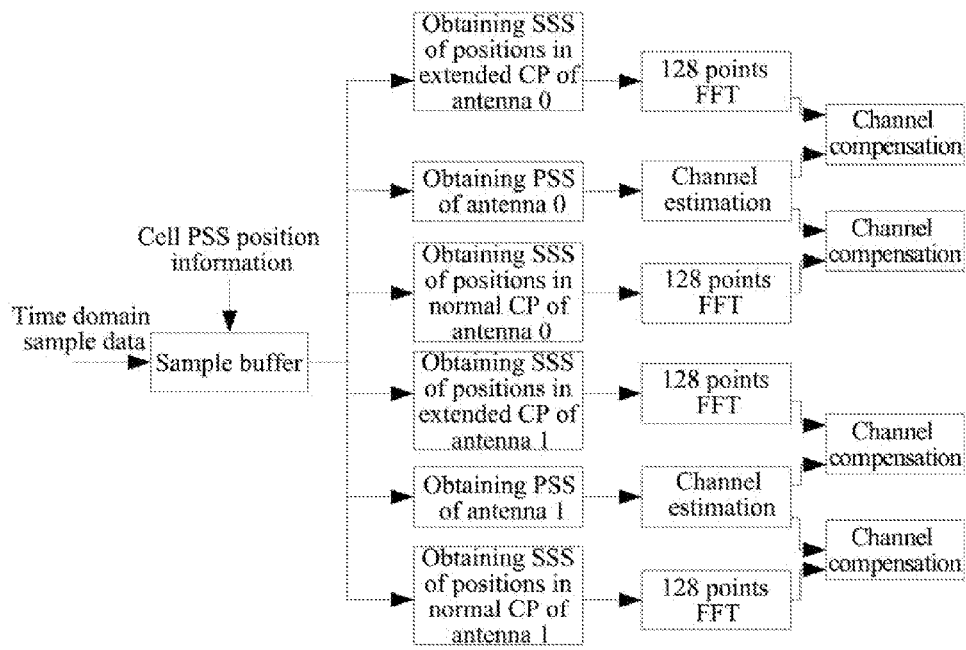
FIG. 5 is a block diagram of the process for compensating the channel estimation according to an example of the present invention.

As shown in FIG. 5, the process of the channel estimation compensation of the example of the present invention comprises: buffering samples, in which the PSS symbols needed in the SSS detection and the SSS symbols in two CP modes are bufferd; obtaining PSS and SSS symbols, in which corresponding SSS symbols and the self PSS symbols are obtained according to the PSS boundary based on different antennae and CP modes, and at the same time, these symbols are transformed into the frequency domain to be processed; performing channel estimation, in which the received PSS symbol is used to perform the channel estimation, and it can be considered that channel estimation of the PSS is approximately equal to the SSS channel estimation; and performing the channel compensation, in which the channel compensation value is obtained according to the result of the channel estimation and the received SSS frequency domain symbol.

FIG. 5 is illustrated by taking two antennae as an example.

1.1 Buffering Samples

Figure 6:
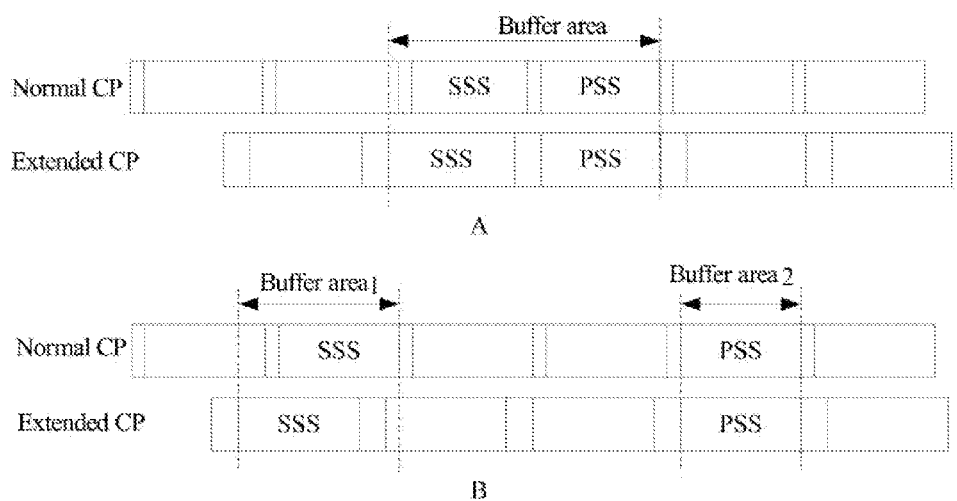
FIG. 6 is a schematic diagram of the position relationship between PSS and SSS and the sample buffer way in different CP mode according to an example of the present invention.

It is required to firstly buffer the PSS symbols needed by the SSS detection and SSS symbols in two CP modes before performing the channel estimation on the PSS symbol. The way for buffering the samples according to the example of the present invention is as shown in FIG. 6. The PSS detection is used to obtain the PSS boundary, and the possible SSS positions in two modes of the extended CP and normal CP can be deduced according to the type of the frame structure of the LTE configuration. As for the single antenna, 288 samples are continuously stored in the type of the FDD frame structure, as shown in A of FIG. 6; two segment storage is used in the type of the TDD frame structure, as shown in B of FIG. 6, the buffer area 1 stores 196 samples, and the buffer area 2 stores 128 samples, 324 samples in sum, and therefore, the sample storage capacity is 648 samples for dual antennae without differentiating the types of the frame structure.

1.2 Channel Estimation

Figure 7:
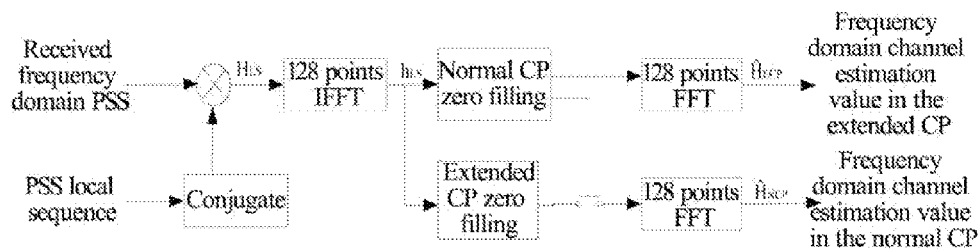
FIG. 7 is another block diagram of the process for compensating the channel estimation according to an example of the present invention.

Since the length of OFDM symbols is much longer than the maximum multipath time delay of the channel, a majority of energies of the channel impulse response obtained by the Inverse fast Fourier transform (IFFT) is centralized in a plurality of relatively minor samples at the front end and back end of the symbol. Herein, the simplified channel estimation method based on the Discrete Fourier Transform (DFT) is adopted by using this characteristic. In order to avoid the distortion on the data signal caused by the over sampling or sending/receiving filtering, the LTE system introduces 10 reserved sub-carriers (namely unused) into 6 Resource Blocks (RB) where the PSSs are situated. The introduction of the reserved sub-carriers causes the diffusion of the Channel Impulse Response (CIR) inside the whole symbol in the system channel estimation, thereby making the energy concentration of the multipath suffer certain damage. Since the multipath energy is mainly centralized at the front end and back end of the symbol, the diffused energy of the multipath in the intermediate part of the symbol is very small. The noise energy is usually larger than the diffused energy caused by the virtual carrier, and the threshold denoising method in the time domain is used to reduce the affect of the noise on the performance of the channel estimation performance. Since the LTE uses two different CP modes, which are respectively applied in different multipath time delay scenarios, so the channel estimation in two CP modes should be performed when the SSS detection method is used to complete the CP identification. The specific method, as shown in FIG. 7, comprises:

(i) the PSS time domain data are obtained according to the time domain PSS positions of the sample buffer area, the transform from the time domain to the frequency domain is performed, and the conjugate calculation of the local PSS code and received transformed PSS frequency domain symbols (the value on the reserved sub-carrier is set to 0) is performed to obtain the channel estimation value estimated by the Least Square (LS), namely $$H_{LS}=S_{PSS}*R_{PSS}$$

wherein $R_{PSS}$ is the received signal, and $S_{PSS}$ is the local PSS code.

(ii) the frequency domain LS estimation value obtained by the LS algorithm is transformed to the time domain by the IFFT transform, $$h_{LS}(n)=IFFT\{H_{LS}(k)\}\ k\in\Omega_{SC}$$

wherein $\Omega_{SC}$ is the sub-carrier domain of the PSS allocation.

(iii) for the extended CP mode, $\lambda_1^{ECP}$ samples at the front end and $\lambda_2^{ECP}$ samples at the back end of the LS estimation value sequence in the time domain act as the channel impulse response (CIR) area of the extended CP, and other areas are noise area $\Omega_{noise}^{ECP}$. The maximum amplitude of the noise areas is selected as the noise threshold $\lambda_{ECP}$, $$\lambda_{ECP}=\max\{|h_{LS}(n)|\}\ n\in\Omega_{noise}^{ECP}$$

all the channel estimation values (namely the channel impulse response (CIR)) lower than the noise threshold are considered as the noise, and are set to 0.

$$h'_{LS,ECP}(n)=\begin{cases} h_{LS}(n) & |h_{LS}(n)|>\lambda_{ECP}, n\notin\Omega_{noise}^{ECP} \\ 0 & others \end{cases}$$

That is, the channel useful powers which are less than the noise power are neglected, and such processing greatly eliminates the interference caused by the noise existing in these paths, thereby playing a role of improving the performance of the channel estimation.

For the normal CP mode, $\lambda_1^{NCP}$ samples at the front end and $\lambda_2^{NCP}$ samples at the back end of the LS estimation values in the time domain act as the channel impulse response (CIR) area (wherein generally $\lambda_1^{ECP}>\lambda_1^{NCP}$ and $\lambda_2^{ECP}>\lambda_2^{NCP}$) of the normal CP, and other areas are noise area $\Omega_{noise}^{NCP}$. In order to simplify the calculation, herein $$\lambda_{NCP}=\lambda_{ECP}$$

Similarly, $$h'_{LS,NCP}(n)=\begin{cases} h_{LS}(n) & |h_{LS}(n)|>\lambda_{ECP}, n\notin\Omega_{noise}^{NCP} \\ 0 & others \end{cases}$$

(iv) the processed CIR is transformed into the frequency domain to obtain the denoised channel frequency response (CFR).

$$\hat{H}_{ECP}(k)=FFT\{h'_{LS,ECP}(n)\}\ k\in\Omega_{SC}$$

$$\hat{H}_{NCP}(k)=FFT\{h'_{LS,NCP}(n)\}\ k\in\Omega_{SC}$$

Herein, the calculated $\hat{H}_{NCP}(k)$, $\hat{H}_{ECP}(k)$ are the denoised channel estimation values of the SSS symbol in the half frame.

For the case that the $h'_{LS,NCP}(n)=h'_{LS,ECP}(n)$, then it does not need to transform the CIR into the frequency domain in the normal CP mode, and at this time, $\hat{H}_{NCP}(k)=\hat{H}_{ECP}(k)$.

In the step of the channel estimation compensation of the SSS detection, multiple times of time and frequency transform (FFT/IFFT) calculation exist, and in order to reduce the hardware resources and data buffer, the following method of time division duplexing time and frequency transform buffer scheduling is used: in the processing duration of a certain antenna, performing in turn: transforming the SSS symbol from the time domain to the frequency domain in the extended CP mode, transforming the PSS symbol from the time domain to the frequency domain in the extended CP mode, transforming the channel estimation value from the frequency domain to the time domain in the extended CP mode, transforming the processed CIR from the time domain to the frequency domain in the extended CP mode, and transforming the processed CIR from the time domain to the frequency domain under the normal CP mode, and transforming SSS from the time domain to the frequency domain in the normal CP mode in sequence; the buffer firstly buffering the SSS frequency domain data in the extended CP mode in processing duration of a certain antenna and being not released until completing the channel estimation compensation in the extended CP mode, and then buffering the denoised frequency domain channel estimation values in the normal CP mode and being not released until completing the channel estimation compensation in the normal CP mode.

Figure 8:
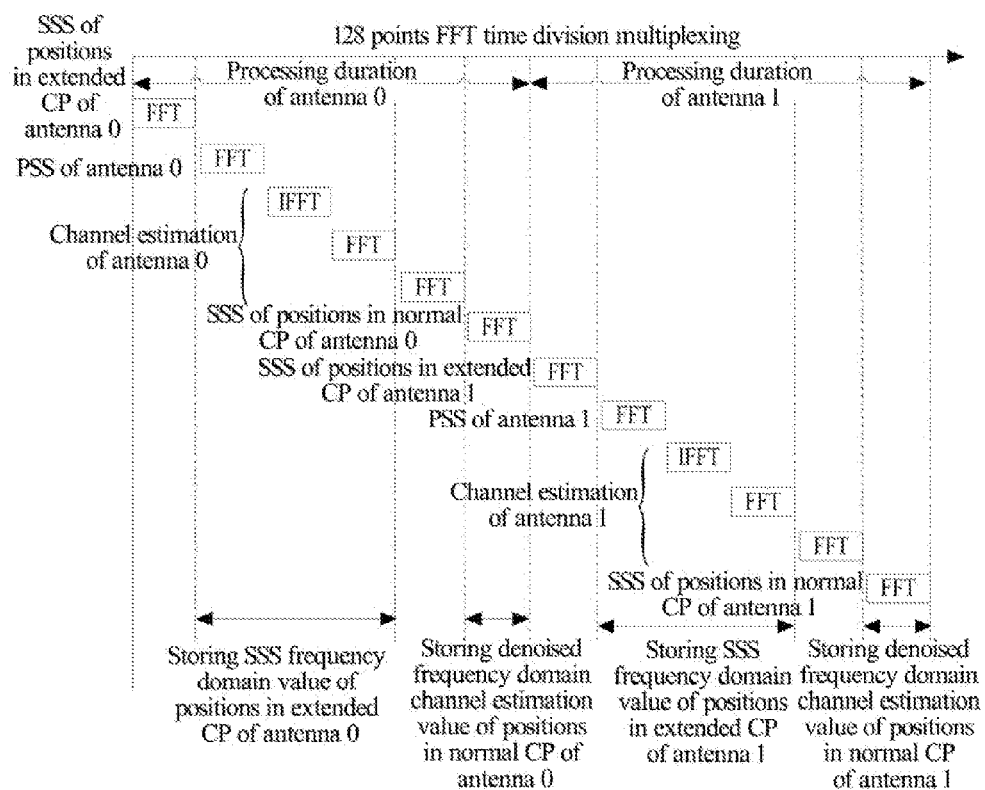
FIG. 8 is a schematic diagram of the FFT/IFFT scheduling policy according to an example of the present invention.

The specific FFT/IFFT scheduling is as shown in FIG. 8. 2 antennae are taken as an example, and the scheduling duration is divided into the processing duration of the antenna 0 and the processing duration of the antenna 1. The FFT/IFFT scheduling in the processing duration of the antenna 0 is the same with that of the antenna 1. Below it will be described by taking the FFT/IFFT scheduling of the antenna 0 as an example. Firstly the SSS is transformed from the time domain to the frequency domain in the extended CP mode, and at this time, the data buffer module stores the transformed SSS frequency domain data; then the channel estimation in the extended CP mode of the antenna 0 is performed; the channel estimation in the normal CP mode of the antenna 0 is performed after performing the SSS compensation under the extended CP mode of the antenna 0, and since the channel estimation compensation of the extended CP mode has completed the calculation at this time, the data buffer module can be released to store denoised frequency domain channel estimation values in the normal CP mode; then the FFT/IFFT module completes to transform the SSS from the time domain to the frequency domain in the normal CP mode, and data buffer module will be released after completing the SSS processing in the normal CP mode. The whole processing process is only required to store data of 62 sub-carriers, and the required resource consumption is minimal and the processing is more efficient.

1.3 Channel Estimation Compensation

The channel estimation compensation is performed using the output of the channel estimation and the received output of the SSS from the time domain to the frequency domain, and the accordance formula is:

$$\hat{R}^{SSS}(k)=\hat{H}^*(k)\cdot R^{SSS}(k)\ k\in\Omega_{SC}$$

wherein $\hat{H}^*(k)$ denotes the conjugate of the channel estimation value of the $k^{th}$ sub-carrier of the SSS symbol; $R^{SSS}(k)$ denotes the value of the $k^{th}$ sub-carrier of the transformed SSS frequency domain symbol; $\hat{R}^{SSS}(k)$ denotes the channel compensation value of the $k^{th}$ sub-carrier of the SSS symbol. Each item in the above formula can be for the extended CP mode of any antenna or the normal CP mode.

2. Half Frame Coherent Accumulation

The even and odd numbering are performed on half frames where the SSS symbols or the compensated SSS symbols are situated, the maximum ratio combining is performed between the antennae of the same half frame, and coherent accumulation is performed by dividing even and odd respectively to obtain $$A_{even}(k) = \sum_{j=0}^{\lfloor (N-1)/2 \rfloor} \sum_{i=0}^{Q-1} \hat{R}_{i,2j}^{SSS}(k) \ k \in \Omega_{SC}$$

$$A_{odd}(k) = \sum_{j=0}^{\lfloor N/2-1 \rfloor} \sum_{i=0}^{Q-1} \hat{R}_{i,2j+1}^{SSS}(k) \ k \in \Omega_{SC}$$

wherein N denotes the number of the accumulated symbols after SSS channel compensation, namely the number of the accumulated half frames; Q denotes the number of the receiving antennae, and 2 antennae are taken as an example to be described in the text; $\hat{R}_{i,2j}^{SSS}(k)$ denotes the channel compensation value output by the $i^{th}$ antenna of the $k^{th}$ sub-carrier in the $2j^{th}$ time of coherent accumulation; $\hat{R}_{i,2j+1}^{SSS}(k)$ denotes the channel compensation value output by the $i^{th}$ antenna of the $k^{th}$ sub-carrier in the $2j+1^{th}$ time of coherent accumulation; $A_{even}(k)$, $A_{odd}(k)$ respectively denotes the coherent accumulation result of the even half frames and the coherent accumulation result of the odd half frames of the $k^{th}$ sub-carrier, and these values can be for the extended CP mode and the normal CP mode.

Figure 9:
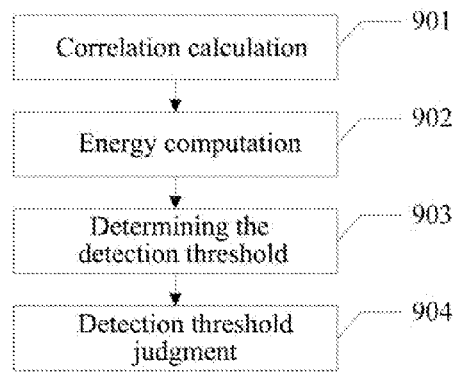
FIG. 9 is a flow chart of the first round detection and the second round detection according to an example of the present invention.

As shown in FIG. 9, the first round detection and the second round detection are both performed by following steps:

Step 901, correlation calculation, in which the correlation values in the extended CP mode and the normal CP mode are calculated according to the coherent accumulative result of the even and/or odd half frames and the SSS sequence.

Step 902, energy computation, in which the correlation energy value is calculated according to the correlation values.

Step 903, determining the detection threshold, in which the average of the summation of the correlation energy value is computed to multiply the detection threshold coefficient to obtain the detection threshold, wherein the summation range of the first round detection is the correlation energy value obtained in the first round detection, and the summation range of the second round detection is the correlation energy value obtained in the first round detection and the correlation energy value obtained in the second round detection.

Step 904, detection threshold judgment, in which the threshold judgment is performed on the correlation energy values according to the detection threshold to obtain the over-threshold correlation energy values of the first round detection or the second round detection.

The methods of the first round detection and the second round detection are similar basically, and only the ways of the correlation calculation, the correlation energy summation ranges, the averaging factors and the threshold coefficients are different. Below the first round detection and the second round detection are respectively described.

3. The First Round Detection

Before the first round detection, the SSS sequence generation is firstly completed according to the sector-ID of the PSS detection, the SSS sequence is combined by the S sequence, C sequence and Z sequence, and the specific generation can refer to 3GPP TS36.211.

Figure 10:
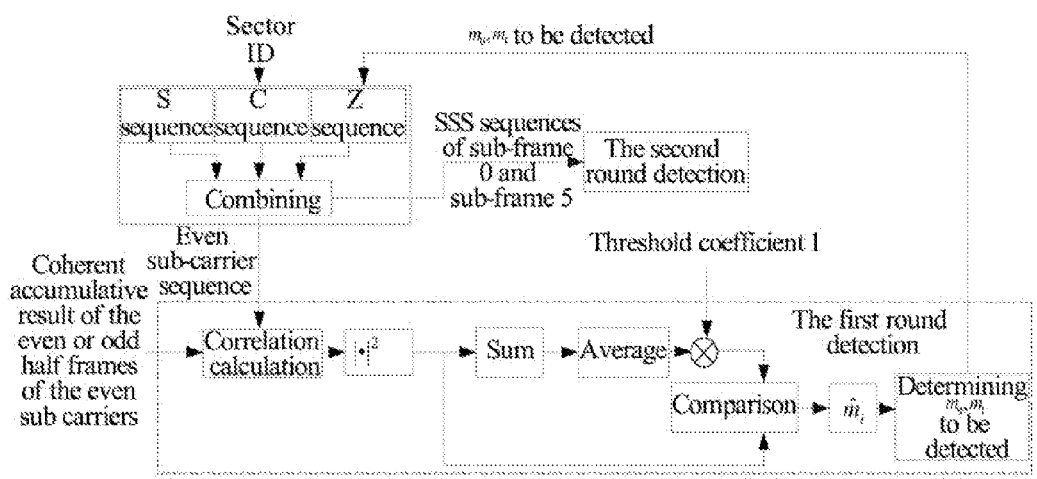
FIG. 10 is a block schematic diagram of the process of the first round detection according to an example of the present invention.

The first round detection is as shown in FIG. 10, and comprises following steps:

correlation calculation:

obtaining the coherent accumulative results of the even sub-carriers in the even or odd half frames (respectively in the extended CP and the normal CP), and using the SSS sequence of the even sub-carriers generated by the sector-ID to perform the correlation calculation. The coherent accumulative result of the even sub-carriers in the even half frames is used to perform the correlation with the SSS sequence of the even sub-carriers, or the coherent accumulative result of the even sub-carriers in the odd half frames is used to perform the correlation with the SSS sequence of the even sub-carriers. Below it will take obtaining the correlation which uses the even half frame coherent accumulative result of the even sub-carrier as an example, and the specific correlation calculation is as follows:

$$C_i = \langle A_{even}^{even\_sc}, d^{even\_sc,i} \rangle \ i=0,1,\ldots,30$$

wherein $C_i$ is the $i^{th}$ correlation value of the first round correlation calculation; $A_{even}^{even\_sc}$ is the coherent accumulative result of the even sub-carrier in the even half frames, namely $A_{even}^{even\_sc} = [A_{even}(0), A_{even}(2), \ldots, A_{even}(60)]$; $d^{even\_sc,i}$ denotes the SSS sequence of the even sub-carrier with the $i^{th}$ serial number, and $\langle \cdot \rangle$ denotes the point multiplication.

Correlation energy computation;

the correlation energy of the first round detection is computed, and the method for computing the correlation energy value is:

$$P_i^1 = |C_i|^2$$

wherein $P_i^1$ denotes the $i^{th}$ correlation energy value of the first round detection, and $C_i$ is the $i^{th}$ correlation value of the first round correlation calculation.

Obtaining the first round detection threshold;

the average of the summation of the correlation energy values is computed to multiply the threshold coefficient 1 to obtain the first round detection threshold, namely $$\bar{P}_1 = \frac{1}{31} \sum_{i=0}^{30} P_i^1$$

$$T_1 = \alpha_1 \cdot \bar{P}_1$$

wherein $P_i^1$ denotes the $i^{th}$ correlation energy value of the first round detection, $\bar{P}_1$ denotes the average correlation energy value, $\alpha_1$ is the threshold coefficient 1, and $T_1$ is the detection threshold 1.

In order to overcome problem of the SSS missing alarm possibility caused by too less sub-carrier data in the coherent accumulative result used in the first round detection, if the first round detection does not have the over-threshold value, then the detection threshold coefficient is adjusted within the range of the times $M_0$ of the first round detection. The adjustment method is:

$$\alpha_1^{i+1} = \alpha_1^i - \delta \ i=0,1,\Lambda,M_0-2$$

wherein $\delta$ is the adjusting step. In the range of the times of the first round detection, once the over-threshold correlation energy value exists, then the first round detection is stopped.

Threshold comparison;

each correlation energy value is compared with the detection threshold 1 to obtain the correlation energy value exceeding the first round detection threshold (called as the over-threshold value of the first round detection), and to further obtain the SSS sequence indexes $\hat{m}_i$ ($i=0, 1, \Lambda, M_1-1$, $M_1$ is the number of the correlation energies exceeding the threshold of the first round detection) corresponding to the over-threshold value of the first round detection.

Figure 11:
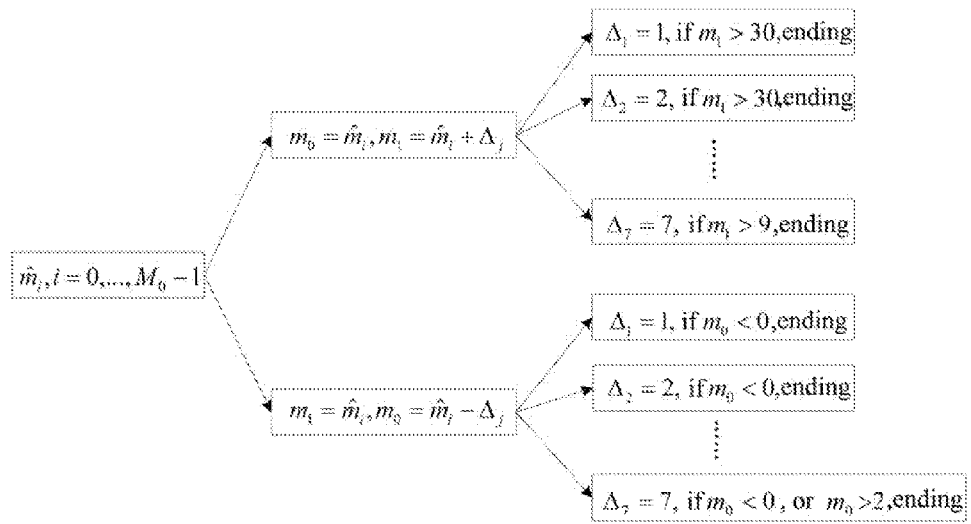
FIG. 11 is a method for determining the cell parameter $m_0$, $m_1$ group to be detected according to an example of the present invention.

Determining the indexes $m_0$, $m_1$ composed of the SSS sequence;

the indexes $m_0$, $m_1$ composed of the SSS sequence used by the second round detection can be further determined by $\hat{m}_i$, as shown in FIG. 11.

As for determining two groups of $m_0$, $m_1$ by one $\hat{m}_i$, a following condition is satisfied: $\hat{m}_i$ is one of $m_0$, $m_1$, and $m_1 - m_0 = \Delta_j$, $\Delta_j = 1, 2 \ldots, 7$, namely the first group is determined according to a following formula:

$$m_0 = \hat{m}_i, m_1 = \hat{m}_i + \Delta_j$$

$$\Delta_j = \begin{cases} j & j = 1, 2, \Lambda, 6; \text{ and } 0 < m_1 \le 30 \\ j & j = 7; \text{ and } 7 \le m_1 \le 9 \end{cases}$$

the second group is determined according to a following formula:

$$m_1 = \hat{m}_i, m_0 = \hat{m}_i - \Delta_j$$

$$\Delta_j = \begin{cases} j & j = 1, 2, \Lambda, 6; \text{ and } m_0 \ge 0 \\ j & j = 7; \text{ and } 0 \le m_0 \le 2 \end{cases}$$

4. The Second Round Detection

Figure 12:
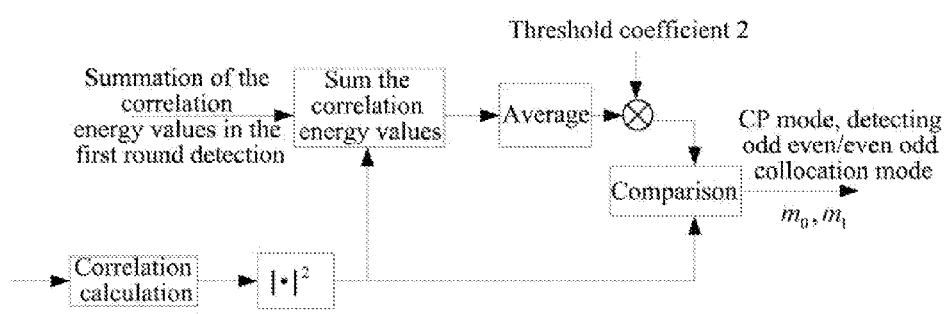
FIG. 12 is a block schematic diagram of the process of the second round detection according to an example of the present invention.
Figure 13:
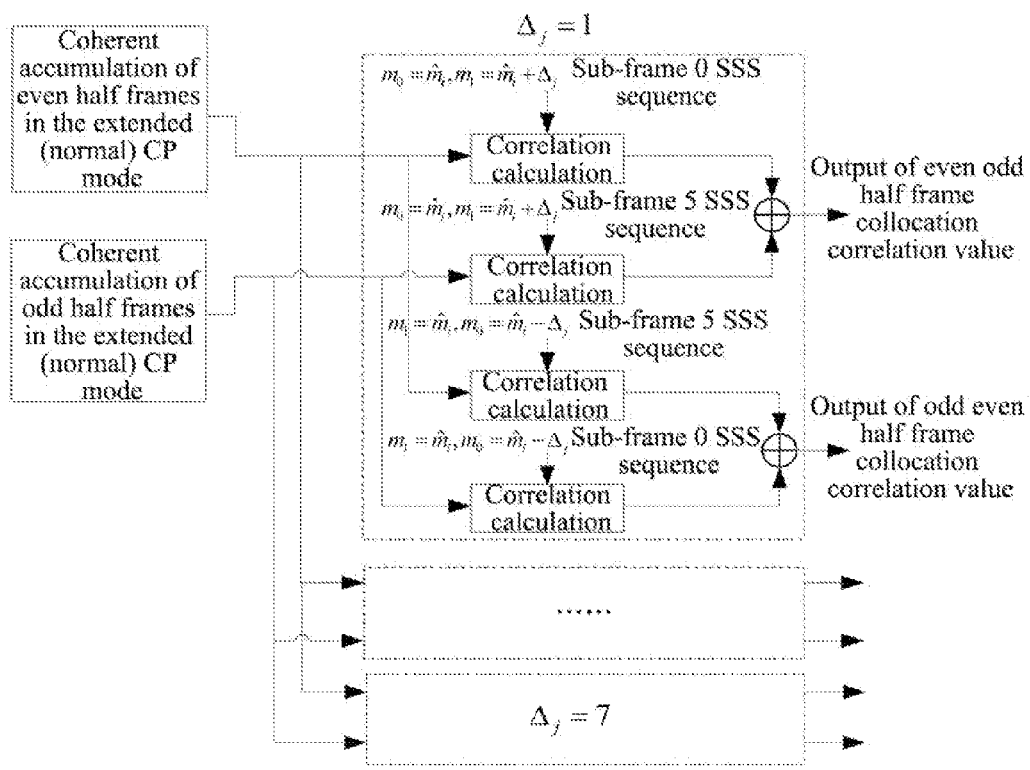
FIG. 13 is a block schematic diagram of the second round detection of the group joint correlation according to an example of the present invention.

As shown in FIG. 12, the second round detection is basically similar to the first round detection, comprising:

the sector-ID and $m_0$, $m_1$ in the cases of the extended CP and the normal CP is obtained by the first round detection, and the coherent accumulative result of all the sub-carriers in the even half frames in the extended CP (or the normal CP) mode and the coherent accumulative result of all the sub-carriers in odd half frames in the extended CP (or the normal CP) mode can be used to perform the grouping joint detection. Grouping is firstly performed according to the value of the $\Delta_j$, and when the first round detection uses the coherent accumulative result of the even sub-carriers in the even half frames to perform the correlation calculation, and if $\hat{m}_i$ is $m_0$, the even odd half frame collocation is used to perform the correlation; if $\hat{m}_i$ is $m_1$, the odd even half frame collocation is used to perform the correlation. When the first round detection uses the coherent accumulative result of the even sub-carriers to in the odd half frames perform the correlation calculation, the half frame collocation way is contrary to the above, namely if $\hat{m}_i$ is $m_0$, the odd even half frame collocation is used to perform the correlation; if $\hat{m}_i$ is $m_1$, the even odd half frame collocation is used to perform the correlation. FIG. 13 shows the collocation way for performing the correlation calculation by the first round detection using the coherent accumulative result of the even sub-carriers in the even half frames. As for one of group $\Delta_j$ thereinto, the specific calculation is as follows:

$$C_{even\_odd} = \langle A_{even}, d_{subframe0}^{(m_0,m_1)} \rangle + \langle A_{odd}, d_{subframe5}^{(m_0,m_1)} \rangle$$

$$C_{odd\_even} = \langle A_{odd}, d_{subframe0}^{(m_0,m_1)} \rangle + \langle A_{even}, d_{subframe5}^{(m_0,m_1)} \rangle$$

wherein $C_{even\_odd}$ and $C_{odd\_even}$ respectively denote the even odd half frame collocation correlation value and the odd even half frame collocation correlation value; $A_{even}$ and $A_{odd}$ respectively denotes the coherent accumulative results of all the sub-carriers in the even half frames and the odd half frames, namely $A_{even} = [A_{even}(0), A_{even}(1), A_{even}(2), \ldots, A_{even}(61)]$, $A_{odd} = [A_{odd}(0), A_{odd}(1), A_{odd}(2), \ldots, A_{odd}(61)]$;

$d_{subframe0}^{(m_0,m_1)}$ and $d_{subframe5}^{(m_0,m_1)}$ respectively denote the SSS sequences determined by the $m_0$ and $m_1$ of the sub-frame 0 and the sub-frame 5.

The average of the summation of the first round detection correlation energy and the energy computed by the correlation value of the second round detection is computed, thereby obtaining the correlation energy average value for the second round detection. The specific method is:

$$P_2 = \sum_{i=0}^{30} P_i^1 + \sum_{j=0}^{M_2-1} P_j^2$$

$$\overline{P}_2 = \frac{P_2}{\frac{31}{4} + M_2}$$

wherein $P_i^1$ denotes the $i^{th}$ correlation energy value of the first round detection, $P_j^2$ denotes the $j^{th}$ correlation energy value of the second round detection, and $P_2$, $\overline{P}_2$ respectively denote the total correlation energy value and the average correlation energy value applied in the second round detection. Herein, it is assumed that the second round detection corresponding to a certain index $\hat{m}_i$ of the first round detection needs $M_2$ times of correlation calculation, and herein the even odd half frame collocation form and the odd even half frame collocation form are included.

The threshold of the second round detection, namely the threshold 2 is $$T_2 = \alpha_2 \cdot \overline{P}_2$$

wherein $\alpha_2$ is the threshold coefficient 2.

6. Secondary Synchronization Signal Detection Result Calculation

The over-threshold correlation energy value of the second round detection (the over-threshold value in the present invention) corresponds to one or more $\Delta_j$ and $m_0$, and one or more cell ID group numbers are obtained according to the following formula:

$$N_{ID}^{(1)} = \begin{cases} m_0 & \text{when } \Delta_j = 1 \\ m_0 + 30 & \text{when } \Delta_j = 2 \\ m_0 + 59 & \text{when } \Delta_j = 3 \\ m_0 + 87 & \text{when } \Delta_j = 4 \\ m_0 + 114 & \text{when } \Delta_j = 5 \\ m_0 + 140 & \text{when } \Delta_j = 6 \\ m_0 + 165 & \text{when } \Delta_j = 7 \end{cases}$$

the corresponding cell ID is $$N_{ID}^{cell} = 3N_{ID}^{(1)} + N_{ID}^{(2)}$$

wherein $N_{ID}^{(2)}$ is the sector-ID.

If the over-threshold value in the second round detection is the extended CP mode data, then the detected cell CP mode is the extended CP; conversely, it is the normal CP mode. If the over-threshold value in the second round detection corresponds to the even odd half frame collocation correlation value, then the radio frame timing is the sub-frame 0 followed by the sub-frame 5; if the over-threshold value in the second round detection corresponds to the odd even half frame collocation correlation value, then the radio frame timing is the sub-frame 5 followed by the sub-frame 0.

EXAMPLE

Figure 14:
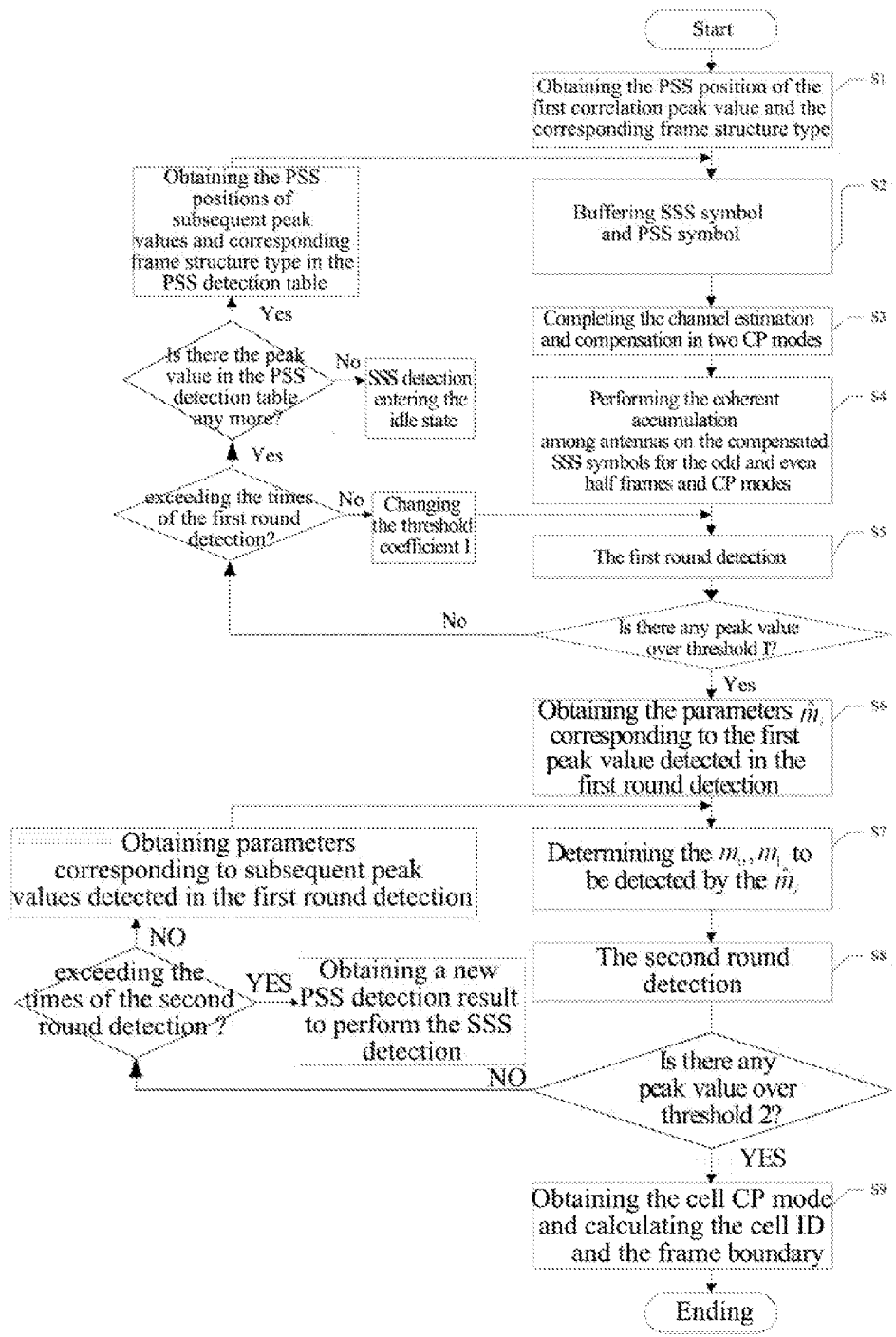
FIG. 14 is a flow chart of the complete example for detecting the SSS according to an example of the present invention.

As shown in FIG. 14, the specific flow for detecting the secondary synchronization signal by using the scheme of the present invention is as follows:

S1, the PSS position of the first correlation peak value in the PSS detection table and the corresponding frame structure type are obtained;

herein the first correlation peak value is obtained by the PSS detection using to number the peak value from the large to the small, namely the maximum peak value.

S2, the possible SSS range is deduced by the PSS position according to the frame structure type and the CP mode, and SSS symbols and PSS symbols in two modes of the extended CP and the normal CP after performing the frequency offset compensation are buffered;

as for the FDD frame structure type, the SSS symbols and the PSS symbols use the continuous storage way; whereas as for the TDD frame structure type, the SSS coverage data range and the PSS symbols in two CP modes are divided into two segments to be stored.

S3, the channel estimation is completed in two CP modes by the PSS symbols to compensate the corresponding frequency domain SSS;

herein the FFT/IFFT can implement the high efficient policy of time and frequency transform buffer scheduling in the above text.

S4, the coherent accumulation between antennae is performed on the compensated SSS symbols by dividing into the odd and even half frames and CP modes;

S5, the sector-ID corresponding to the PSS and the even sub-carrier value in the coherent accumulative result of the even/odd half frames are obtained to perform the first round detection, it is judged whether the peak value exceeding the detection threshold 1 exists, and if exists, S6 is continued to be performed, if does not exist, the threshold coefficient 1 is gradually decreased according to the adjusting step with the times of the first round detection in the range of the times of the first round detection; if exceeding the times of the first round detection, the it is inquired whether the peak value further exists in the PSS detection table, if the peak value exists, the next result information of the current PSS detection result is obtained to continue to perform the detection, that is, the S2 is re-entered, or else the SSS detection enters the idle state.

S6, the parameters $\hat{m}_i$ corresponding to the first peak value detected by the first round detection are obtained;

herein, $\hat{m}_i$ are also numbered from the large to small according to its corresponding peak value.

S7, the $m_0$, $m_1$ to be detected are determined by the parameters $\hat{m}_i$, and the determining method is as abovementioned;

S8, the coherent accumulation results of the even half frames and the odd half frames are performed the grouping joint second round detection according to the relationship between $m_0$ and $m_1$, and it is judged whether the peak value exceeding the detection threshold 2 exists, and if exists, the S9 is continued to be performed, if does not exist, the parameters corresponding to the subsequent peak values detected by the first round detection are re-obtained in the range of the times of the second round detection, that is, the S7 is re-entered; if the times of the detection exceed the times of the second round detection, then the new PSS detection result is obtained to perform the SSS detection, that is, S2 is entered;

S9, the parameters corresponding to the peak value exceeding the threshold 2 are obtained from S8 to obtain the CP mode of the SSS detection at this time, and the cell ID and the radio frame boundary are calculated.

The above scheme of the present invention is implemented in the CP mode detection, and if the CP mode is known, the SSS detection is able to not perform the CP mode detection, and the specific flow is as follows:

S1a, the PSS position of the first correlation peak value in the PSS detection table and the corresponding frame structure type are obtained;

herein the PSS detection uses to number the peak value from the large to the small to obtain the first correlation peak value, namely the maximum peak value.

S2a, SSS symbols and PSS symbols after performing the frequency offset compensation are bufferd by the PSS positions according to the frame structure type and the CP mode;

as for the FDD frame structure type, the SSS symbols and the PSS symbols use the continuous storage way; whereas as for the TDD frame structure type, the SSS symbols and the PSS symbols are divided into two segments to be stored.

Figure 18:
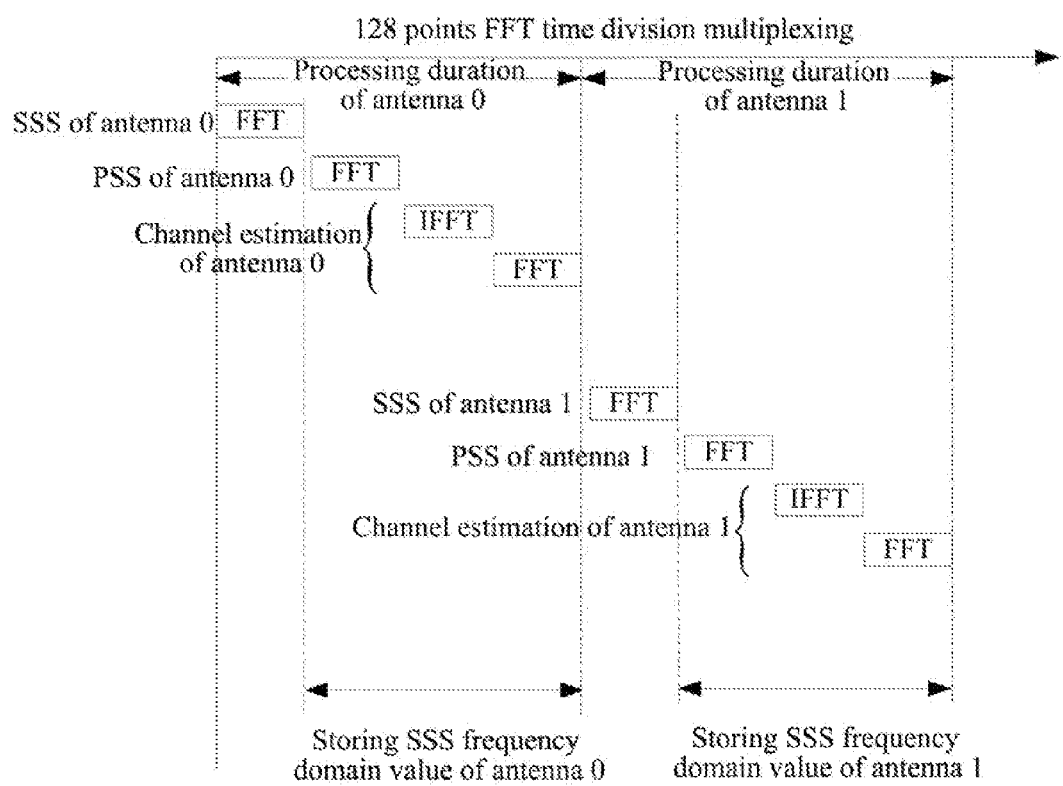
FIG. 18 is a schematic diagram of the FFT/IFFT scheduling policy in a case of the known CP mode according to an example of the present invention.

S3a, the channel estimation in the corresponding CP mode is completed by the PSS symbols to compensate the frequency domain SSS;

herein the FFT/IFFT can implement the high efficient policy of time and frequency transform buffer scheduling, as shown in FIG. 18.

2 antennae are taken as an example. The scheduling duration is divided into the processing duration of the antenna 0 and the processing duration of the antenna 1. The FFT/IFFT scheduling in the processing duration of the antenna 0 is the same with that of the antenna 1. Below it will be described by taking the FFT/IFFT scheduling of the antenna 0 as an example. Firstly the SSS is transformed from the time domain to the frequency domain in the corresponding CP mode, and at this time, the data buffer module stores the transformed SSS frequency domain data; then the channel estimation in the corresponding CP mode of the antenna 0 is performed; the data buffer module releases the stored data after performing the channel compensation on the transformed SSS frequency domain data stored by the data buffer module, and SSS processing in the corresponding CP mode of the antenna 0 is completed.

S4a, the coherent accumulation between antennae is performed on the compensated SSS symbols by dividing into the odd and even half frames;

S5a, the sector-ID corresponding to the PSS and the even sub-carrier value in the coherent accumulative result of even/odd half frames are obtained to perform the first round detection, it is judged whether the peak value exceeding the detection threshold 1 exists, and if exists, S6a is continued to be performed, if does not exist, the threshold coefficient 1 is gradually decreased according to the adjusting step with the times of the first round detection in the range of the times of the first round detection; if exceeding the times of the first round detection, it is inquired whether the peak value further exists in the PSS detection table, if the peak value exists, the next result information of the current PSS detection result is obtained to continue to perform the detection, that is, the S2a is re-entered, or else the SSS detection enters the idle state.

S6a, the parameters $\hat{m}_i$ corresponding to the first peak value detected by the first round detection are obtained;

herein, $\hat{m}_i$ are also numbered from the large to small according to its corresponding peak value.

S7a, the $m_0$, $m_1$ to be detected are determined by the parameters $\hat{m}_i$, and the determining method is as abovementioned;

S8a, the coherent accumulation results of the even half frames and the odd half frames are performed the group joint second round detection according to the relationship between $m_0$ and $m_1$, it is judged whether the peak value exceeding the detection threshold 2 exists, and if exists, the S9a is continued to be performed, if does not exist, the parameters corresponding to the subsequent peak values detected by the first round detection are re-obtained in the range of the times of the second round detection, that is, the S7a is re-entered; if the times of the detection exceeds the times of the second round detection, then the new PSS detection result is obtained to perform the SSS detection, that is, S2a is entered;

S9a, the parameters corresponding to the peak value exceeding the threshold 2 are obtained from S8a to calculate the cell ID and the radio frame boundary.

Figure 15:
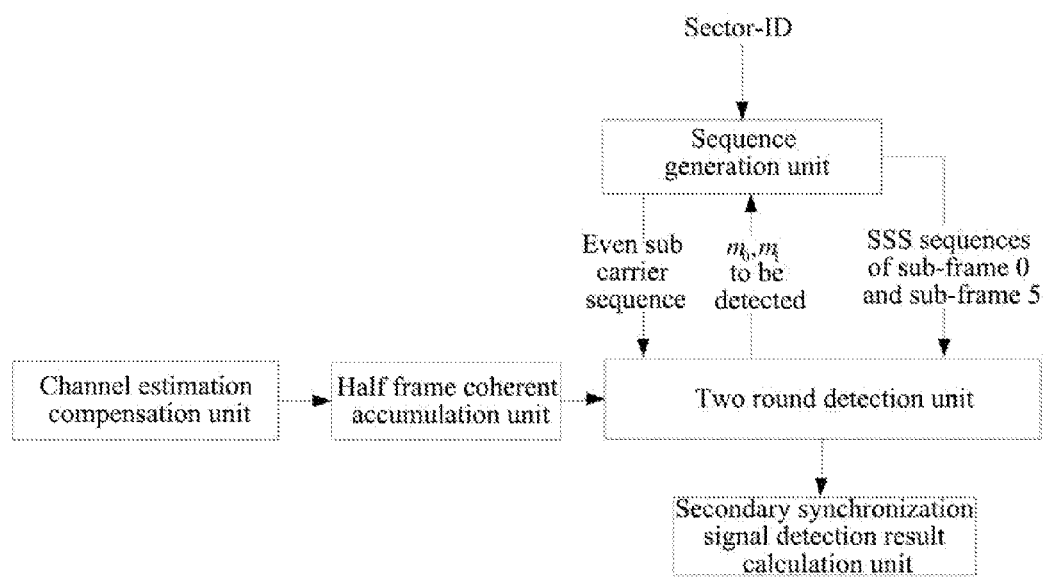
FIG. 15 is a structure block diagram of the apparatus for detecting a secondary synchronization signal according to an example of the present invention.

In order to implement the above method, the present invention further provides an apparatus for detecting a secondary synchronization signal, and as shown in FIG. 15, the apparatus comprises:

a channel estimation compensation unit, which is configured to: calculate a channel estimation compensation value of each sub-carrier of a SSS symbol in different Cyclic Prefix (CP) modes or a specified CP mode;

a half frame coherent accumulation unit, which is connected with the channel estimation compensation unit. This half frame coherent accumulation unit is configured to: obtain a coherent accumulative result of even half frames and a coherent accumulative result of odd half frames of each sub-carrier according to the channel estimation compensation value of each sub-carrier of the SSS symbol;

a sequence generation unit, which is configured to: generate a secondary synchronization signal (SSS) sequence;

a two round detection unit, which is connected with the half frame coherent accumulation unit and the sequence generation unit. This two round detection unit is configured to: use the coherent accumulative result of even sub-carriers in the even or odd half frames and the SSS sequence of the even sub-carrier to perform the correlation calculation and compute the energy to obtain an index $\hat{m}_i$ of the SSS sequence corresponding to an over-threshold value of the first round detection; and determine indexes $m_0$, $m_1$ composed of the SSS sequence used in the second round detection according to index $\hat{m}_i$, use the coherent accumulative results of all the sub-carriers in the even and odd half frames and the SSS sequences of all the sub-carriers to perform the collocation correlation calculation and compute the energy to obtain an over-threshold value of the second round detection, wherein one of $m_0$, $m_1$ is $\hat{m}_i$, and $m_1 - m_0 = \Delta_j$, $\Delta_j = 1, 2 \ldots, 7$; and a secondary synchronization signal detection result calculation unit, which is connected with the two round detection unit. And this secondary synchronization signal detection result calculation unit is configured to: obtain the CP mode according to parameters corresponding to the over-threshold value of the second round detection if the channel estimation compensation unit calculates the channel estimation compensation value of each sub-carrier of the SSS symbol in different CP modes, and calculate the cell ID and the radio frame boundary; calculate the cell ID and the radio frame boundary according to parameters corresponding to the over-threshold value of the second round detection if the channel estimation compensation unit calculates the channel estimation compensation value of each sub-carrier of the SSS symbol in the specified CP mode.

Below the specific implementation of each unit according to the example of the present invention will be described in detail:

The channel estimation compensation unit has following two implementation ways:

way 1, the channel estimation compensation unit comprises:

a channel estimation module, which is configured to: perform the time and frequency transform, which comprises: transforming the PSS symbol and the SSS symbol from the time domain to the frequency domain, and performing the channel estimation on the PSS symbol to obtain the channel estimation value of each sub-carrier of the PSS symbol which is not denoised; and a channel compensation module, which is connected with the channel estimation module. This channel compensation module is configured to: approximate the channel estimation value of the PSS symbol as the channel estimation value of the SSS symbol, and perform the channel compensation on the transformed SSS frequency domain symbol to obtain the channel compensation value of each sub-carrier of the SSS symbol.

Figure 16:
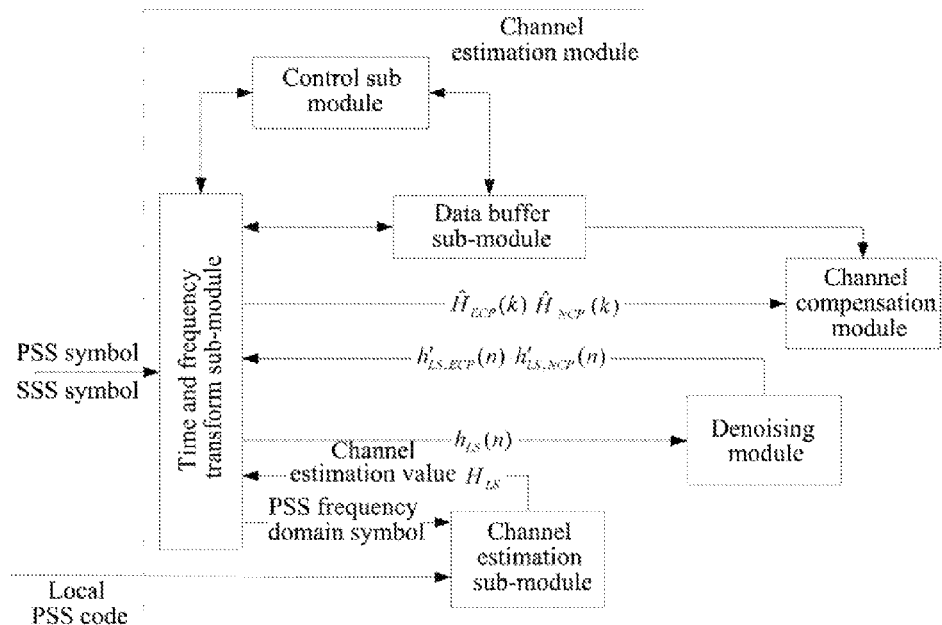
FIG. 16 is a structure block diagram of the channel estimation unit according to an example of the present invention.

Way 2, as shown in FIG. 16, the channel estimation compensation unit comprises:

a channel estimation module, which is configured to: perform the time and frequency transform, which comprises: transforming the PSS symbol and the SSS symbol to the frequency domain, transforming the channel estimation value to the time domain, transforming the threshold denoised channel impulse response to the frequency domain to obtain the denoised frequency domain channel estimation value, and performing the channel estimation on the PSS symbol to obtain the channel estimation value of each sub-carrier of the PSS symbol;

a denoising module, which is connected with the channel estimation module. This denoising module is configured to: perform the threshold denoising on the channel impulse response (CIR) area according to the channel estimation value transformed to the time domain; and a channel compensation module, which is connected with the channel estimation module. This channel compensation module is configured to: use the denoised frequency domain channel estimation value and the transformed SSS frequency domain symbol to perform the channel compensation to obtain the channel compensation value of each sub-carrier of the SSS symbol.

Wherein the channel estimation module comprises:

a control sub-module, which is configured to: control the time and frequency transform sub-module and data buffer sub-module to achieve an object of the time division multiplexing of the FFT/IFFT module;

the time and frequency transform sub-module, which is configure to: implement the time and frequency domain transform of the time division duplexing under the control of the control sub-module, if the CP mode detection is performed, in the processing duration of a certain antenna, to perform in turn to: transform the SSS symbol from the time domain to the frequency domain in the extended CP mode and transform the PSS symbol from the time domain to the frequency domain, transform LS channel estimation value from the frequency domain to the time domain, transform the processed CIR from the time domain to the frequency domain in the extended CP mode, transform the processed CIR from the time domain to the frequency domain in the normal CP mode, and transform the SSS from the time domain to the frequency domain in the normal CP mode in sequence; if it is the specified CP mode, in the processing duration of a certain antenna, to perform in turn to: transform the SSS symbol from the time domain to the frequency domain in the specified CP mode, transform the PSS symbol from the time domain to the frequency domain, transform the LS channel estimation value from the frequency domain to the time domain, and transform the processed CIR from the time domain to the frequency domain in sequence;

the data buffer sub-module, which is configured to: buffer the data after the time and frequency transform under the control of the control module, if the CP mode detection is performed, firstly buffer the SSS frequency domain data in the extended CP mode in processing duration of a certain antenna and do not release the SSS frequency domain data until completing the channel estimation compensation in the extended CP mode, and then buffer the denoised frequency domain channel estimation value in the normal CP mode and do not release the denoised frequency domain channel estimation value until completing the channel estimation compensation in the normal CP mode; if it is the specified CP mode, store the SSS frequency domain data in the specified CP mode in processing duration of a certain antenna; and a channel estimation sub-module, which is connected with the time and frequency transform sub-module. This channel estimation sub-module is configured to: use the local PSS code and the transformed PSS frequency domain symbol to perform calculation to obtain the channel estimation value of the Least Square (LS) estimation.

The half frame coherent accumulation unit performs the even and odd numbering on half frames where the SSS symbols or the compensated SSS symbols are located, performs the maximum ratio combining among the SSS symbol compensation value antennae of the same half frame, and performs coherent accumulation by dividing into even and odd respectively to obtain the coherent accumulative result of the even half frames and the coherent accumulative result of the odd half fames of each sub-carrier.

Said coherent accumulation unit calculates the coherent accumulative result of the even half frames and the coherent accumulative result of the odd half fames of each sub-carrier according to following formulas.

$$A_{even}(k) = \sum_{j=0}^{\lfloor(N-1)/2\rfloor} \sum_{i=0}^{Q-1} \hat{R}_{i,2j}^{SSS}(k) \ k \in \Omega_{SC}$$

$$A_{odd}(k) = \sum_{j=0}^{\lfloor N/2-1\rfloor} \sum_{i=0}^{Q-1} \hat{R}_{i,2j+1}^{SSS}(k) \ k \in \Omega_{SC}$$

wherein N denotes the number of the accumulated half frames; Q denotes the number of the receiving antennae; $\hat{R}_{i,2j}^{SSS}(k)$ denotes the channel compensation value output by the $i^{th}$ antenna of the $k^{th}$ sub-carrier in the $2j^{th}$ time of coherent accumulation; $\hat{R}_{i,2j+1}^{SSS}(k)$ denotes the channel compensation value output by the $i^{th}$ antenna of the $k^{th}$ sub-carrier in the $2j+1^{th}$ time of coherent accumulation; $A_{even}(k)$, $A_{odd}(k)$ respectively denotes the coherent accumulation result of the even half frames and the coherent accumulation result of the odd half frames of the $k^{th}$ sub-carrier.

Figure 17:
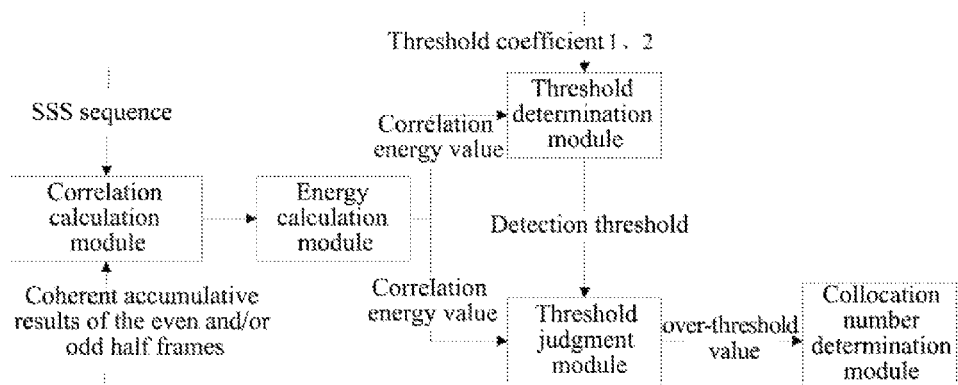
FIG. 17 is a structure block diagram of the two round detection unit according to an example of the present invention.

As shown in FIG. 17, the two round detection unit comprises:

a correlation calculation module, which is configured to: calculate the correlation values in the extended CP mode and the normal CP mode according to the coherent accumulative result of the even and/or odd half frames and the SSS sequence if the channel estimation compensation value of each sub-carrier of the SSS symbol in different CP modes; calculate the correlation value in the specified CP mode according to the coherent accumulative result of the even and/or odd half frames and the SSS sequence if the channel estimation compensation unit calculates the channel estimation compensation value of each sub-carrier of the SSS symbol in the specified CP mode;

an energy calculation module, which is connected with the correlation calculation module. This energy calculation module is configured to: calculate the correlation energy value according to the correlation value calculated by the correlation calculation module;

a threshold determination module, which is configured to: compute the average of the summation of the correlation energy to multiply the detection threshold coefficient to obtain the detection threshold, wherein the summation range of the first round detection is the correlation energy value obtained in the first round detection, and the summation range of the second round detection is the correlation energy value obtained in the first round detection and the correlation energy value obtained in the second round detection;

a threshold judgment module, which is configured to: perform the threshold judgment on the correlation energy value obtained in the first around according to the first round detection threshold and perform the threshold judgment on the correlation energy value obtained in the second around according to the second round detection threshold; and a collocation number determination module, which is configured to: determine the indexes $m_0$, $m_1$ composed of the SSS sequence used by the second round detection by the index $\hat{m}_i$ of the SSS sequence corresponding to the over-threshold value in the first round detection.

the first round detection uses the coherent accumulative result of the even sub-carrier in the even half frames to perform the correlation calculation, when performing the second round detection, and if $\hat{m}_i$ is $m_0$, the correlation calculation module uses the coherent accumulative results of all the sub-carriers in the even and odd half frames to respectively perform the collocation correlation with the SSS sequences of all the sub-carriers in sub-frame 0 and sub-frame 5 to obtain the even odd collocation correlation value; if $\hat{m}_i$ is $m_1$, the correlation calculation module uses the coherent accumulative results of all the sub-carriers in the odd and even half frames to respectively perform the collocation correlation with the SSS sequences of all the sub-carriers in sub-frame 0 and sub-frame 5 to obtain the odd even collocation correlation value;

the first round detection uses the coherent accumulative result of the even sub-carrier in the odd half frames to perform the correlation calculation, when performing the second round detection, and if $\hat{m}_i$ is $m_1$, the correlation calculation module uses the coherent accumulative results of all the sub-carriers in the even and odd half frames to respectively perform the collocation correlation with the SSS sequences of all the sub-carriers in sub-frame 0 and sub-frame 5 to obtain the even odd collocation correlation value; if $\hat{m}_i$ is $m_0$, the correlation calculation module uses the coherent accumulative results of all the sub-carriers in the odd and even half frames to respectively perform the collocation correlation with the SSS sequences of all the sub-carriers in sub-frame 0 and sub-frame 5 to obtain the odd even collocation correlation value;

the correlation calculation module calculates the odd even half frame collocation correlation value and the even odd half frame collocation correlation value according to following formulas:

$$C_{even\_odd} = \langle A_{even}, d_{subframe0}^{(m_0,m_1)} \rangle + \langle A_{odd}, d_{subframe5}^{(m_0,m_1)} \rangle$$

$$C_{odd\_even} = \langle A_{odd}, d_{subframe0}^{(m_0,m_1)} \rangle + \langle A_{even}, d_{subframe5}^{(m_0,m_1)} \rangle$$

wherein $C_{even\_odd}$ and $C_{odd\_even}$ respectively denote the even and odd half frame collocation correlation value and the odd and even half frame collocation correlation value; $A_{even}$ and $A_{odd}$ respectively denotes the coherent accumulative results of all the sub-carriers in the even half frames and the odd half frames, namely $A_{even}=[A_{even}(0), A_{even}(1), A_{even}(2), \ldots, A_{even}(61)]$, $A_{odd}=[A_{odd}(0), A_{odd}(1), A_{odd}(2), \ldots, A_{odd}(61)]$; $d_{subframe0}^{(m_0,m_1)}$ and $d_{subframe5}^{(m_0,m_1)}$ respectively denote the SSS sequences determined by the $m_0$ and $m_1$ of the sub-frame 0 and the sub-frame 5.

Said secondary synchronization signal detection result calculation unit obtains the cell ID group numbers are obtained according to $\Delta_j$ and $m_0$ corresponding to the over-threshold value of the second round detection and the following formula:

$$N_{ID}^{(1)} = \begin{cases} m_0 & \text{when } \Delta_j = 1 \\ m_0 + 30 & \text{when } \Delta_j = 2 \\ m_0 + 59 & \text{when } \Delta_j = 3 \\ m_0 + 87 & \text{when } \Delta_j = 4 \\ m_0 + 114 & \text{when } \Delta_j = 5 \\ m_0 + 140 & \text{when } \Delta_j = 6 \\ m_0 + 165 & \text{when } \Delta_j = 7 \end{cases}$$

and the corresponding cell ID is $$N_{ID}^{cell} = 3N_{ID}^{(1)} + N_{ID}^{(2)}$$

wherein $N_{ID}^{(2)}$ is the sector-ID.

In the case of detecting the CP mode, if the correlation energy value of the extended CP mode exceeds the threshold in the second round detection is the data, then the detected cell CP mode is the extended CP; conversely, it is the normal CP mode.

If the over-threshold value in the second round detection corresponds to the even odd half frame collocation correlation value, then the radio frame timing is the sub-frame 0 followed by the sub-frame 5; if the over-threshold value in the second round detection corresponds to the odd even half frame collocation correlation value, then the radio frame timing is the sub-frame 5 followed by the sub-frame 0.

When the over-threshold value does not appear in the first round detection, the threshold determination module is further configured to adjust the detection threshold coefficient in the range of the times $M_0$ of the first round detection, and the adjustment way is:

$$\alpha_1^{i+1} = \alpha_1^i - \delta \ i=0,1,\Lambda,M_0-2$$

wherein $\delta$ is the adjusting step.

A person having ordinary skill in the art can appreciate that all or parts of the steps in the above method may be implemented by instructing related hardware with a program, which may be stored in a computer-readable medium, such as a read-only memory, a magnetic disk or an optical disk and so on. Alternatively, all or parts of the steps of the above examples may also be implemented by using one or more integrated circuits. Correspondingly, each module/unit in the above examples may be implemented in the form of hardware, or in the form of software functional modules. The present invention is not limited to any particular form of the combination of hardware and software.

In the specific embodiment of the present invention, the positions of the SSS sequence are at the sub-frame 0 and sub-frame 5, which is related to the definition of the protocol. When the positions of the SSS sequence defined in the protocol change, the present invention is also applicable.

The method and the apparatus for detecting the secondary synchronization signal of the present invention use the two round detection method to detect the SSS, which greatly reduces the calculation quantity of the correlation calculation without increasing additional resource consumption, and implements the higher efficient detection on a basis of ensuring the performance. Comparing with the prior art, if the detection use the complete sequence detection, the local 336 groups of SSSs need 336*2=672 times of correlation altogether without considering the identification of the CP mode, and if the CP mode is considered, it needs 672*2=1344 times of detection. Obviously, the calculation quantity of the complete sequence detection is considerably large, but the present invention reduces the calculation quantity of the correlation in a greater degree, which obtains a very well compromise between the detection efficiency and the performance.

As for one result obtained in the first round detection, the second around only needs to perform 56 times of the detection (including the CP mode detection) at most.

The present invention uses a method based on the DFT to perform the channel estimation on the SSS, and in order to overcome the problem of the diffusion of the Channel Impulse Response (CIR) in the whole symbol in the system channel estimation caused by the introduction of the reserved sub-carriers, a threshold de-noise method is used to improve the performance of the channel estimation, which has a not large computational complexity, and it is determined whether to start the Channel Frequency Response (CFR) solution of the normal CP by a zero filling way in the extended CP mode and normal CP mode. The optimized channel estimation and coherent detection method ensures the detection performance of the SSS itself and the CP detection performance.

The detection process uses multiple times of FFT/IFFT, and in order to reduce the resource consumption and achieve the calculation efficiency simultaneously, a time division multiplexing measure is used for the FFT/IFFT and a high efficient scheduling policy is applied, which occupies least resources.

In order to overcome problem of the SSS missing alarm possibility caused by too less sub-carrier data in the coherent accumulative result used in the first round detection, the present invention uses a method for adjusting the threshold coefficient 1 in the range of the times of the first round detection.

The first round detection and the second round detection can use the same structures in the specific implementation of the present invention, which will not increase the additional resources.

Industrial Applicability

The method and the apparatus for detecting the secondary synchronization signal of the present invention use the two round detection method to detect the SSS, which greatly reduces the calculation quantity of the correlation calculation without increasing additional resource consumption, and implements the higher efficient detection on a basis of ensuring the performance. The present invention uses a threshold denoising method to improve the performance of the channel estimation, which has a not large computational complexity. The present invention uses multiple times of FFT/IFFT in the detection process, and applies a high efficient scheduling policy, which occupies the least resources.

What is claimed is:

1. A method for detecting a secondary synchronization signal, comprising:
    calculating a channel estimation compensation value of each sub-carrier of a Secondary Synchronization Signal (SSS) symbol in different Cyclic Prefix (CP) modes;

obtaining a coherent accumulative result of even half frames and a coherent accumulative result of odd half frames of each sub-carrier according to the channel estimation compensation value of each sub-carrier of said SSS symbol;

generating a SSS sequence;

using the coherent accumulative results of even sub-carriers in the even or odd half frames and the SSS sequences of the even sub-carriers to perform correlation calculation and compute an energy, obtaining an index $\hat{m}_i$ of the SSS sequence corresponding to an over-threshold value of a first round detection, determining indexes $m_0$, $m_1$ composing the SSS sequence used in a second round detection according to the index $\hat{m}_i$, wherein one of $m_0$ and $m_1$ is $\hat{m}_i$, $m_1 - m_0 = \Delta_j$, and $\Delta_j = 1, 2, \ldots, 7$;

using the coherent accumulative results of all the sub-carriers in the even and odd half frames and SSS sequences of all the sub-carriers to perform collocation correlation calculation and compute an energy, obtaining an over-threshold value of the second round detection; and obtaining a CP mode according to parameters corresponding to the over-threshold value of the second round detection, and calculating a cell Identifier (ID) and a radio frame boundary.

2. The method of claim 1, wherein the step of calculating the channel estimation compensation value of each sub-carrier of the SSS symbol in different CP modes comprises:

performing channel estimation on a Primary Synchronization Signal (PSS) symbol to obtain a channel estimation value of each sub-carrier of the PSS symbol;

transforming the channel estimation value to a time domain, performing threshold denoising on a Channel Impulse Response (CIR) area, transforming the denoised CIR to a frequency domain to obtain a denoised frequency domain channel estimation value; and using the denoised frequency domain channel estimation value and a transformed SSS frequency domain symbol to perform channel compensation to obtain a channel estimation compensation value of each sub-carrier of the SSS symbol.

3. The method of claim 2, wherein in the step of calculating the channel estimation compensation value of each sub-carrier of the SSS symbol in different CP modes, a buffer scheduling way of transform between the time domain and the frequency domain comprises:

in a processing duration of a certain antenna, performing: transforming the SSS symbol from the time domain to the frequency domain in an extended CP mode, transforming the PSS symbol from the time domain to the frequency domain, transforming the channel estimation value from the frequency domain to the time domain, transforming the denoised CIR from the time domain to the frequency domain in the extended CP mode, transforming the denoised CIR from the time domain to the frequency domain in a normal CP mode, and transforming SSS from the time domain to the frequency domain in the normal CP mode in turn; a buffer firstly buffering SSS frequency domain data in the extended CP mode in the processing duration of the certain antenna and being not released until completing channel estimation compensation in the extended CP mode, and then buffering a denoised frequency domain channel estimation value in the normal CP mode and being not released until completing the channel estimation compensation in the normal CP mode.

4. The method of claim 2, wherein the step of performing threshold denoising on the CIR area comprises:

$\lambda_1$ samples at a front end and $\lambda_2$ samples at a back end of a channel estimation value sequence in the time domain acting as the CIR area, and other areas being noise areas, selecting a maximum amplitude of the noise area as a noise threshold, all the channel estimation values lower than the noise threshold in the CIR area being noise, and setting all the channel estimation values lower than the noise threshold in the CIR area to be 0.

5. The method of claim 1, wherein the step of obtaining the coherent accumulative result of even half frames and the coherent accumulative result of odd half frames of each sub-carrier comprises:

performing even and odd numbering on the half frames where the SSS symbols or the SSS symbols after the channel estimation compensation are situated, performing maximum ratio combining for SSS symbol channel compensation values of an identical half frame among antennas, and performing coherent accumulation for even and odd respectively to obtain the coherent accumulative result of even half frames and the coherent accumulative result of odd half frames of each sub-carrier.

6. The method of claim 1, wherein the step of using the coherent accumulative results of even sub-carriers in the even or odd half frames and the SSS sequences of the even sub-carriers to perform correlation calculation and compute the energy and obtaining the index $\hat{m}_i$ of the SSS sequence corresponding to the over-threshold value of the first round detection or the step of using coherent accumulative results of all the sub-carriers in the even and odd half frames and SSS sequences of all the sub-carriers to perform collocation correlation calculation and compute the energy and obtaining the over-threshold value of the second round detection comprises:

calculating correlation values in the extended CP mode and the normal CP mode according to the coherent accumulative result of the even and/or odd half frames and the SSS sequences;

calculating correlation energy values according to the correlation values;

computing an average after calculating a summation of the correlation energy values to multiply the average by a detection threshold coefficient to obtain a detection threshold, wherein a summation range of the first round detection is the correlation energy values obtained in the first round detection, and a summation range of the second round detection is the correlation energy values obtained in the first round detection and the correlation energy values obtained in the second round detection; and performing a threshold judgment on the correlation energy values according to the detection threshold to obtain the over-threshold values of the first round detection or the second round detection.

7. The method of claim 1, wherein the over-threshold value of the first round detection is obtained by multiplying an average of correlation energy value of the first round detection by a detection threshold coefficient, if the over-threshold value does not appear in the first round detection, then the detection threshold coefficient is adjusted within a range of times $M_0$ of the first round detection, and an adjustment way is:

$$\alpha_1^{i+1} = \alpha_1^i - \delta \ i = 0, 1, \Lambda, M_0 - 2$$

wherein $\delta$ is an adjusting step.

8. The method of claim 1, wherein the step of performing collocation correlation calculation comprises:
   when the first round detection uses the accumulative results of the even sub-carriers in the even half frames to perform the correlation calculation, and if $\hat{m}_i$ is $m_0$, performing collocation correlation on the coherent accumulative results of all the sub-carriers in the even and odd half frames with the SSS sequences of all the sub-carriers in sub-frame 0 and sub-frame 5 respectively to obtain an even odd collocation correlation value; if $\hat{m}_i$ is $m_1$, using the coherent accumulative results of all the sub-carriers in the odd and even half frames to perform the collocation correlation with the SSS sequences of all the sub-carriers in sub-frame 0 and sub-frame 5 respectively to obtain an odd even collocation correlation value;
   when the first round detection uses the coherent accumulative results of the even sub-carriers in the odd half frames to perform the correlation calculation, and if $\hat{m}_i$ is $m_1$, performing collocation correlation on the coherent accumulative results of all the sub-carriers in the even and odd half frames with the SSS sequences of all the sub-carriers in sub-frame 0 and sub-frame 5 respectively to obtain an even odd collocation correlation value; if $\hat{m}_i$ is $m_0$, using the coherent accumulative results of all the sub-carriers in the odd and even half frames to perform the collocation correlation with the SSS sequences of all the sub-carriers in sub-frame 0 and sub-frame 5 respectively to obtain an odd even collocation correlation value.

9. The method of claim 1, wherein in the step of obtaining the CP mode according to the parameter corresponding to the over-threshold value of the second round detection and calculating the cell ID and the radio frame boundary, a cell ID group number is obtained according to $\Delta_j$ and $m_0$ corresponding to the over-threshold value of the second round detection and following formula:

$$N_{ID}^{(1)} = \begin{cases} m_0 & \text{when } \Delta_j = 1 \\ m_0 + 30 & \text{when } \Delta_j = 2 \\ m_0 + 59 & \text{when } \Delta_j = 3 \\ m_0 + 87 & \text{when } \Delta_j = 4 \\ m_0 + 114 & \text{when } \Delta_j = 5 \\ m_0 + 140 & \text{when } \Delta_j = 6 \\ m_0 + 165 & \text{when } \Delta_j = 7 \end{cases}$$

and a corresponding cell ID is $$N_{ID}^{cell} = 3N_{ID}^{(1)} + N_{ID}^{(2)}$$

wherein $N_{ID}^{(2)}$ is a sector-ID,
if the correlation energy value of the extended CP mode exceeds the threshold in the second round detection, then the detected cell CP mode is the extended CP; otherwise, the detected cell CP mode is the normal CP mode;
if the over-threshold value in the second round detection corresponds to an even odd half frame collocation correlation value, then a radio frame timing phrase is sub-frame 0 followed by sub-frame 5; if the over-threshold value in the second round detection corresponds to an odd even half frame collocation correlation value, then radio frame timing is the sub-frame 5 followed by the sub-frame 0.

10. An apparatus for detecting a secondary synchronization signal, comprising:
   a channel estimation compensation unit, which is configured to calculate a channel estimation compensation value of each sub-carrier of a Secondary Synchronization Signal (SSS) symbol in different Cyclic Prefix (CP) modes or a specified CP mode;
   a half frame coherent accumulation unit, which is connected with the channel estimation compensation unit and is configured to obtain a coherent accumulative result of even half frames and a coherent accumulative result of odd half frames of each sub-carrier according to the channel estimation compensation value of each sub-carrier of said SSS symbol;
   a sequence generation unit, which is configured to generate a SSS sequence;
   a two round detection unit, which is connected with said half frame coherent accumulation unit and said sequence generation unit, and is configured to use the coherent accumulative results of even sub-carriers in the even or odd half frames and the SSS sequences of the even sub-carriers to perform correlation calculation and compute an energy, obtain an index $\hat{m}_i$ of the SSS sequence corresponding to an over-threshold value of a first round detection; and determine indexes $m_0$, $m_1$ composing the SSS sequence used in a second round detection according to the index $\hat{m}_i$, and use coherent accumulative results of all the sub-carriers in the even and odd half frames and SSS sequences of all the sub-carriers to perform collocation correlation calculation and compute an energy, and obtain an over-threshold value of the second round detection, wherein one of $m_0$ and $m_1$ is $\hat{m}_i$, $m_1 - m_0 = \Delta_j$, and $\Delta_j = 1, 2, \ldots, 7$;
   a secondary synchronization signal calculation unit, which is connected with said two round detection unit and is configured to obtain a CP mode according to parameters corresponding to an over-threshold value of the second round detection if the channel estimation compensation unit calculates the channel estimation compensation value of each sub-carrier of the SSS symbol in different CP modes, and calculate a cell Identifier (ID) and a radio frame boundary; calculate the cell ID and the radio frame boundary according to parameters corresponding to an over-threshold value of the second round detection if the channel estimation compensation unit calculates the channel estimation compensation value of each sub-carrier of the SSS symbol in the specified CP mode.

11. The apparatus of claim 10, wherein said half frame coherent accumulation unit is configured to obtain the coherent accumulative result of even half frames and the coherent accumulative result of odd half frames of each sub-carrier in a following way: performing even and odd numbering on the half frames where the SSS symbols or the SSS symbols after the channel estimation compensation are situated, performing maximum ratio combining for SSS symbol channel compensation values of an identical half frame among antennas, and performing coherent accumulation for even and odd respectively to obtain the coherent accumulative result of even half frames and the coherent accumulative result of odd half frames of each sub-carrier.

12. The apparatus of claim 10, wherein said two round detection unit comprises:
   a correlation calculation module, which is configured to: calculate correlation values in an extended CP mode and a normal CP mode according to the coherent accumulative result of the even and/or odd half frames and SSS sequences if the channel estimation compensation unit calculates the channel estimation compensation value of each sub-carrier of the SSS symbol in different CP modes; calculate the correlation value in the specified CP mode according to the coherent accumulative result of the even and/or odd half frames and the SSS sequence if the channel estimation compensation unit calculates the channel estimation compensation value of each sub-carrier of the SSS symbol in the specified CP mode;

an energy calculation module, which is connected with the correlation calculation module and is configured to calculate correlation energy values according to the correlation value calculated by the correlation calculation module;

a threshold determination module, which is configured to: compute an average after calculating a summation of the correlation energy values to multiply the average by a detection threshold coefficient to obtain a detection threshold, wherein a summation range of the first round detection is the correlation energy values obtained in the first round detection, and a summation range of the second round detection is the correlation energy values obtained in the first round detection and the correlation energy values obtained in the second round detection;

a threshold judgment module, which is configured to: perform the threshold judgment on the correlation energy value obtained in the first around detection according to a first round detection threshold and perform the threshold judgment on the correlation energy value obtained in the second around according to a second round detection threshold; and a collocation number determination module, which is configured to: determine indexes $m_0$, $m_1$ composing the SSS sequence used in the second round detection according to an index $\hat{m}_i$ of the SSS sequence corresponding to the over-threshold value in the first round detection.

13. The apparatus of claim 12, wherein when the over-threshold value does not appear in the first round detection, said threshold determination module is further configured to: adjust the detection threshold coefficient in a range of times $M_0$ of the first round detection, and an adjustment way is:

$$\alpha_1^{i+1} = \alpha_1^i - \delta \; i = 0,1,\Lambda, M_0 - 2$$

wherein $\delta$ is an adjusting step.

14. The apparatus of claim 12, wherein said correlation calculation module is configured to calculate correlation values in the extended CP mode and the normal CP mode or correlation values in the specified CP mode according to the coherent accumulative result of the even and/or odd half frames and SSS sequences in a following way:

when the first round detection uses the coherent accumulative results of the even sub-carriers in the even half frames to perform the correlation calculation, in the second round detection, if $\hat{m}_i$ is $m_0$, said correlation calculation module using the coherent accumulative results of all the sub-carriers in the even and odd half frames to perform collocation correlation with the SSS sequences of all the sub-carriers in sub-frame 0 and sub-frame 5 respectively to obtain an even odd collocation correlation value; if $\hat{m}_i$ is $m_1$, said correlation calculation module using the coherent accumulative results of all the sub-carriers in the odd and even half frames to perform the collocation correlation with the SSS sequences of all the sub-carriers in sub-frame 0 and sub-frame 5 respectively to obtain an odd even collocation correlation value;

when the first round detection uses the coherent accumulative results of the even sub-carriers in the odd half frames to perform the correlation calculation, in the second round detection, if $\hat{m}_i$ is $m_1$, said correlation calculation module using the coherent accumulative results of all the sub-carriers in the even and odd half frames to perform collocation correlation with the SSS sequences of all the sub-carriers in sub-frame 0 and sub-frame 5 respectively to obtain an even odd collocation correlation value; if $\hat{m}_i$ is $m_0$, said correlation calculation module using the coherent accumulative results of all the sub-carriers in the odd and even half frames to perform the collocation correlation with the SSS sequences of all the sub-carriers in sub-frame 0 and sub-frame 5 respectively to obtain an odd even collocation correlation value.

15. A method for detecting a secondary synchronization signal, comprising:

calculating a channel estimation compensation value of each sub-carrier of a Secondary Synchronization Signal (SSS) symbol in a specified Cyclic Prefix (CP) mode;

obtaining a coherent accumulative result of even half frames and a coherent accumulative result of odd half frames of each sub-carrier according to the channel estimation compensation value of each sub-carrier of said SSS symbol;

generating a SSS sequence;

using the coherent accumulative results of even sub-carriers in the even or odd half frames and the SSS sequences of the even sub-carriers to perform correlation calculation and compute an energy, obtaining an index $\hat{m}_i$ of the SSS sequence corresponding to an over-threshold value of a first round detection, determining indexes $m_0$, $m_1$ composing the SSS sequence used in a second round detection according to the index $\hat{m}_i$, wherein one of $m_0$ and $m_1$ is $\hat{m}_i$, $m_1 - m_0 = \Delta_j$, and $\Delta_j = 1, 2 \ldots, 7$;

using coherent accumulative results of all the sub-carriers in the even and odd half frames and SSS sequences of all the sub-carriers to perform collocation correlation calculation and compute an energy, obtaining an over-threshold value of the second round detection; and calculating a cell Identifier (ID) and a radio frame boundary according to the over-threshold value of the second round detection.

16. The method of claim 15, wherein the step of calculating the channel estimation compensation value of each sub-carrier of the SSS symbol in the specified CP mode comprises:

performing channel estimation on a Primary Synchronization Signal (PSS) symbol to obtain a channel estimation value of each sub-carrier of the PSS symbol;

transforming the channel estimation value to a time domain, performing threshold denoising on a Channel Impulse Response (CIR) area, transforming the denoised CIR to a frequency domain to obtain a denoised frequency domain channel estimation value; and using the denoised frequency domain channel estimation value and a transformed SSS frequency domain symbol to perform channel compensation to obtain a channel estimation compensation value of each sub-carrier of the SSS symbol.

17. The method of claim 16, wherein in the step of calculating the channel estimation compensation value of each sub-carrier of the SSS symbol in the specified CP mode, a buffer scheduling way of transform between the time domain and the frequency domain comprises:

in a processing duration of a certain antenna, performing: transforming the SSS symbol from the time domain to the frequency domain in the specified CP mode, transforming the PSS symbol from the time domain to the frequency domain, transforming the channel estimation value from the frequency domain to the time domain, transforming the denoised CIR from the time domain to the frequency domain in the specified CP mode in turn; a buffer firstly buffering SSS frequency domain data in the specified CP mode in the processing duration of the certain antenna and being not released until completing channel estimation compensation in the specified CP mode.

18. The method of claim 15, wherein the step of obtaining the coherent accumulative result of even half frames and the coherent accumulative result of odd half frames of each sub-carrier comprises:

performing even and odd numbering on the half frames where the SSS symbols or the SSS symbols after the channel estimation compensation are situated, performing maximum ratio combining for SSS symbol channel compensation value of an identical half frame among antennas, and performing coherent accumulation for even and odd respectively to obtain the coherent accumulative result of even half frames and the coherent accumulative result of odd half frames of each sub-carrier.

19. The method of claim 15, wherein the step of using the coherent accumulative results of even sub-carriers in the even or odd half frames and the SSS sequences of the even sub-carriers to perform correlation calculation and compute the energy and obtaining the index $\hat{m}_i$ of the SSS sequence corresponding to the over-threshold value of the first round detection or the step of using coherent accumulative results of all the sub-carriers in the even and odd half frames and SSS sequences of all the sub-carriers to perform collocation correlation calculation and compute the energy and obtaining the over-threshold value of the second round detection comprises:

calculating correlation values in the specified CP mode according to the coherent accumulative result of the even and/or odd half frames and the SSS sequences;

calculating correlation energy values according to the correlation values;

computing an average after calculating a summation of the correlation energy values to multiply the average by a detection threshold coefficient to obtain a detection threshold, wherein a summation range of the first round detection is the correlation energy values obtained in the first round detection, and a summation range of the second round detection is the correlation energy values obtained in the first round detection and the correlation energy values obtained in the second round detection; and performing a threshold judgment on the correlation energy values according to the detection threshold to obtain the over-threshold values of the first round detection or the second round detection.

20. The method of claim 15, wherein the step of performing collocation correlation calculation comprises:

when the first round detection uses the coherent accumulative results of the even sub-carriers in the even half frames to perform the correlation calculation, and if $\hat{m}_i$ is $m_0$, performing collocation correlation on the coherent accumulative results of all the sub-carriers in the even and odd half frames with the SSS sequences of all the sub-carriers in sub-frame 0 and sub-frame 5 respectively to obtain an even odd collocation correlation value; if $\hat{m}_i$ is $m_1$, using the coherent accumulative results of all the sub-carriers in the odd and even half frames to perform the collocation correlation with the SSS sequences of all the sub-carriers in sub-frame 0 and sub-frame 5 respectively to obtain an odd even collocation correlation value;

when the first round detection uses the coherent accumulative results of the even sub-carriers in the odd half frames to perform the correlation calculation, and if $\hat{m}_i$ is $m_1$, performing collocation correlation on the coherent accumulative results of all the sub-carriers in the even and odd half frames with the SSS sequences of all the sub-carriers in sub-frame 0 and sub-frame 5 respectively to obtain an even odd collocation correlation value; if $\hat{m}_i$ is $m_0$, using the coherent accumulative results of all the sub-carriers in the odd and even half frames to perform the collocation correlation with the SSS sequences of all the sub-carriers in sub-frame 0 and sub-frame 5 respectively to obtain an odd even collocation correlation value.

* * * * *